United States Patent
Das et al.

(10) Patent No.: US 8,913,549 B2
(45) Date of Patent: Dec. 16, 2014

(54) CONGESTION CONTROL IN AN OPTICAL LINE TERMINAL

(75) Inventors: Abhimanyu Das, Los Angeles, CA (US); Eugene Lee, San Jose, CA (US); Deyi Dong, Shanghai (CN); Dongsheng Zhang, Fremont, CA (US)

(73) Assignee: Cortina Access, Inc., Sunnyvale, CA (US)

( * ) Notice: Subject to any disclaimer, the term of this patent is extended or adjusted under 35 U.S.C. 154(b) by 262 days.

(21) Appl. No.: 13/208,304

(22) Filed: Aug. 11, 2011

(65) Prior Publication Data

US 2013/0039182 A1 Feb. 14, 2013

(51) Int. Cl.
*H04B 7/204* (2006.01)
*H04L 12/801* (2013.01)
*H04Q 11/00* (2006.01)
*H04L 12/24* (2006.01)

(52) U.S. Cl.
CPC ............ *H04L 41/0816* (2013.01); *H04L 47/14* (2013.01); *H04Q 11/0067* (2013.01); *H04Q 2011/0064* (2013.01)
USPC .......................................................... 370/325

(58) Field of Classification Search
None
See application file for complete search history.

(56) References Cited

U.S. PATENT DOCUMENTS

| | | | |
|---|---|---|---|
| 6,229,788 B1* | 5/2001 | Graves et al. | 370/230 |
| 7,164,682 B2* | 1/2007 | Iwamura et al. | 370/395.21 |
| 2007/0212071 A1* | 9/2007 | Guo et al. | 398/69 |
| 2008/0225711 A1* | 9/2008 | Raszuk et al. | 370/230.1 |
| 2009/0210553 A1* | 8/2009 | Takase et al. | 709/232 |
| 2009/0232498 A1* | 9/2009 | Tsuge et al. | 398/58 |
| 2011/0307588 A1* | 12/2011 | Thyni et al. | 709/222 |
| 2012/0294611 A1* | 11/2012 | Adler et al. | 398/45 |

OTHER PUBLICATIONS

Swapnil Bhatia, Department of Computer Science, University of New Hampshire, "Design of DBA Algorithms for EPONs", 2 pages.
IEEE Std. 802.3-2008, "Multipoint MAC Control", CSMA/CD, pp. 245-302.

\* cited by examiner

*Primary Examiner* — Dang Ton
*Assistant Examiner* — Ronald h Davis
(74) *Attorney, Agent, or Firm* — Amin, Turocy & Watson, LLP

(57) ABSTRACT

There are disclosed systems and methods for detecting and controlling congestion in an Optical Line Terminal (OLT). The OLT has a plurality of ports. Each port of the plurality of ports communicates with at least one Optical Network Unit (ONU), and each port of the plurality of ports has a respective enforced maximum upstream bandwidth. For example, the maximum upstream bandwidth may be enforced by a Dynamic Bandwidth Allocation (DBA) algorithm. The OLT further includes an uplink port through which data received from each of the plurality of ports are transmitted. In one embodiment, if there is congestion of the data at the uplink port, then the enforced maximum upstream bandwidth for at least one port of the plurality of ports is modified.

28 Claims, 14 Drawing Sheets

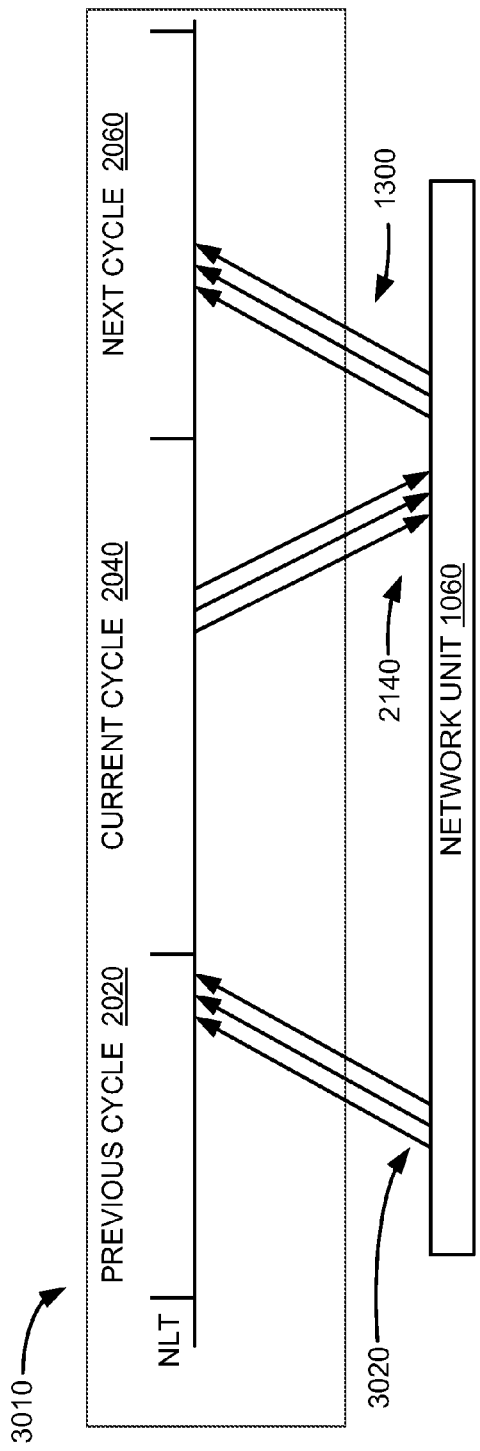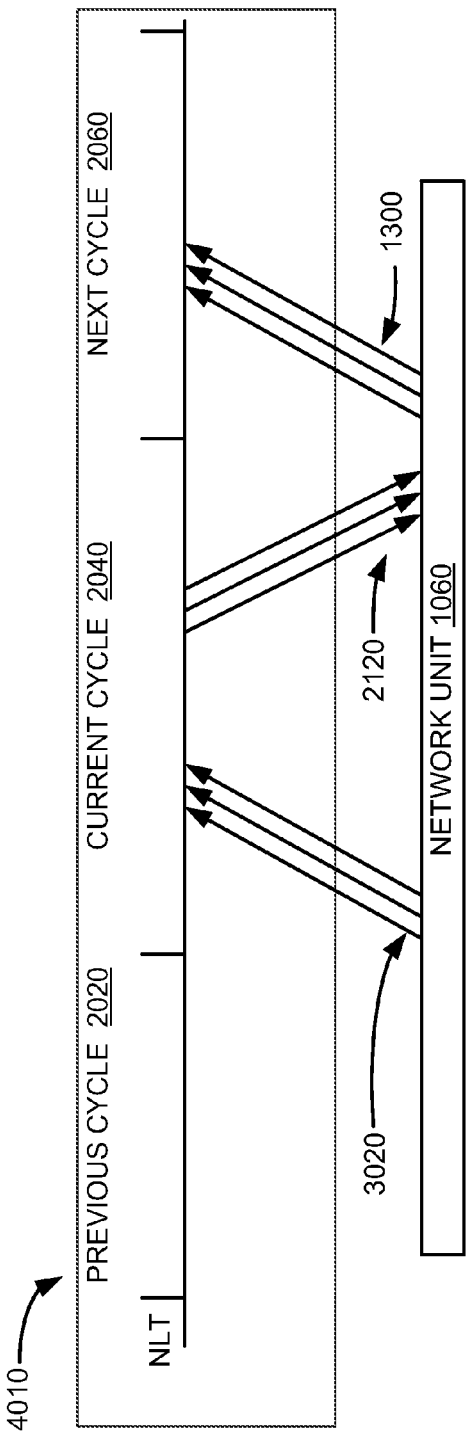

CONGESTION CONTROL IN AN OPTICAL LINE TERMINAL

FIELD

This application relates to passive optical networks.

BACKGROUND

Access networks connect business and residential subscribers to the central offices of service providers, which in turn are connected to metropolitan area networks (MANs) or wide area networks (WANs). Often, these access networks are hybrid fiber coax (HFC) systems with an optical fiber based feeder network between the central office and a remote node, and an electrical distribution network between the remote node and subscribers. In so-called "Fiber-to-the-x" (FTTx) access networks, the copper-based distribution part of the access network is replaced with optical fiber, e.g., fiber-to-the-curb (FTTC) or fiber-to-the-home (FTTH). In doing so, the capacity of the access network is increased.

Passive optical networks (PONs) are optical networks that can be used in such applications. A PON is a point-to-multipoint, fiber to the premises network architecture in which unpowered optical splitters are used to enable a single optical fiber to serve multiple premises. A PON consists of at least one optical line terminal (OLT) at the service provider's central office and a number of optical network units (ONUs) near end users. A PON configuration can reduce the amount of fiber and central office equipment required compared with point to point architectures. Examples of types of PONs that are defined by international standard bodies include Ethernet Passive Optical Networks (EPONs) and Gigabit Passive Optical Networks (GPONs).

Often an OLT at the central office will have several ports, each of which interfaces with several ONUs. Data received from the ONUs at each of these ports is stored in a buffer in the OLT and queued for transmission through an uplink port to a backplane. The backplane typically connects the OLT to an external network, such as the Internet, a private network, or to other OLTs.

Each one of the ports at the OLT has a maximum bandwidth at which data can be received from the ONUs. This maximum bandwidth is typically enforced by a dynamic bandwidth allocation (DBA) algorithm. However, the uplink port through which the data is transmitted from the OLT to the backplane also has a maximum bandwidth. If the sum of the maximum bandwidths of each of the ports servicing the ONUs is greater than the maximum bandwidth of the uplink port, then congestion may occur in the OLT. For example, if the OLT has two ports, each servicing 256 ONUs, and each port allows a maximum of 10 Gbps of data to be received from the ONUs, then the maximum rate of data received at the OLT is 20 Gbps (2 ports at 10 Gbps each). However, if the uplink port through which data is forwarded from the OLT to the backplane only has a maximum bandwidth of 10 Gbps, then congestion may occur during periods of time when the total rate of data received from all of the ONUs across each of the ports is greater than 10 Gbps.

BRIEF DESCRIPTION

Embodiments of the present application will be described, by way of example only, with reference to the accompanying figures wherein:

FIG. 10 is an example of a main schedule processing timeline implemented by a DBA engine;

FIG. 11 is an example of a low latency schedule processing timeline implemented by a DBA engine;

Like reference numerals are used in different figures to denote similar elements.

DETAILED DESCRIPTION

In general, there are disclosed methods and systems for managing congestion in an Optical Line Terminal (OLT). The OLT has a plurality of ports, each of which is used for communicating with at least one Optical Network Unit (ONU). Each of these ports has a respective enforced maximum upstream bandwidth. The OLT further includes an uplink port through which data received from each of the plurality of ports are transmitted. If it is determined that there is congestion of the data in the OLT queued for transmission through the uplink port, then the enforced maximum upstream bandwidth for at least one of the ports interfacing with the ONUs is modified. This can have the benefit of reducing congestion in the OLT, since the total amount of data received at the OLT from the ONUs can be reduced while the enforced maximum upstream bandwidth is modified. For example, in one example embodiment, a lower maximum upstream bandwidth may be enforced at each of the ports by reducing the number of transmission windows granted to the ONUs and/or by reducing the length of one or more of the transmission windows granted to the ONUs. By such a reduction, less data can be transmitted from the ONUs, which will help alleviate congestion in the OLT.

For illustrative purposes, embodiments will now be explained in greater detail below in conjunction with the figures.

The embodiments set forth herein represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as computer readable instructions, data structures, program modules, or other data. A non-exhaustive list of examples of computer readable storage media include magnetic cassettes, magnetic tape, magnetic disk storage or other magnetic storage devices, optical disks such as CD-ROM, digital versatile disks (DVD) or other optical storage, volatile and non-volatile, removable and non-removable media implemented in any method or technology, RAM, ROM, EEPROM, flash memory or other memory technology. Any such computer storage media may be part of the device or accessible or connectable thereto. Any application or module herein described may be implemented using computer readable/executable instructions that may be stored or otherwise held by such computer readable storage media.

Figure 1:
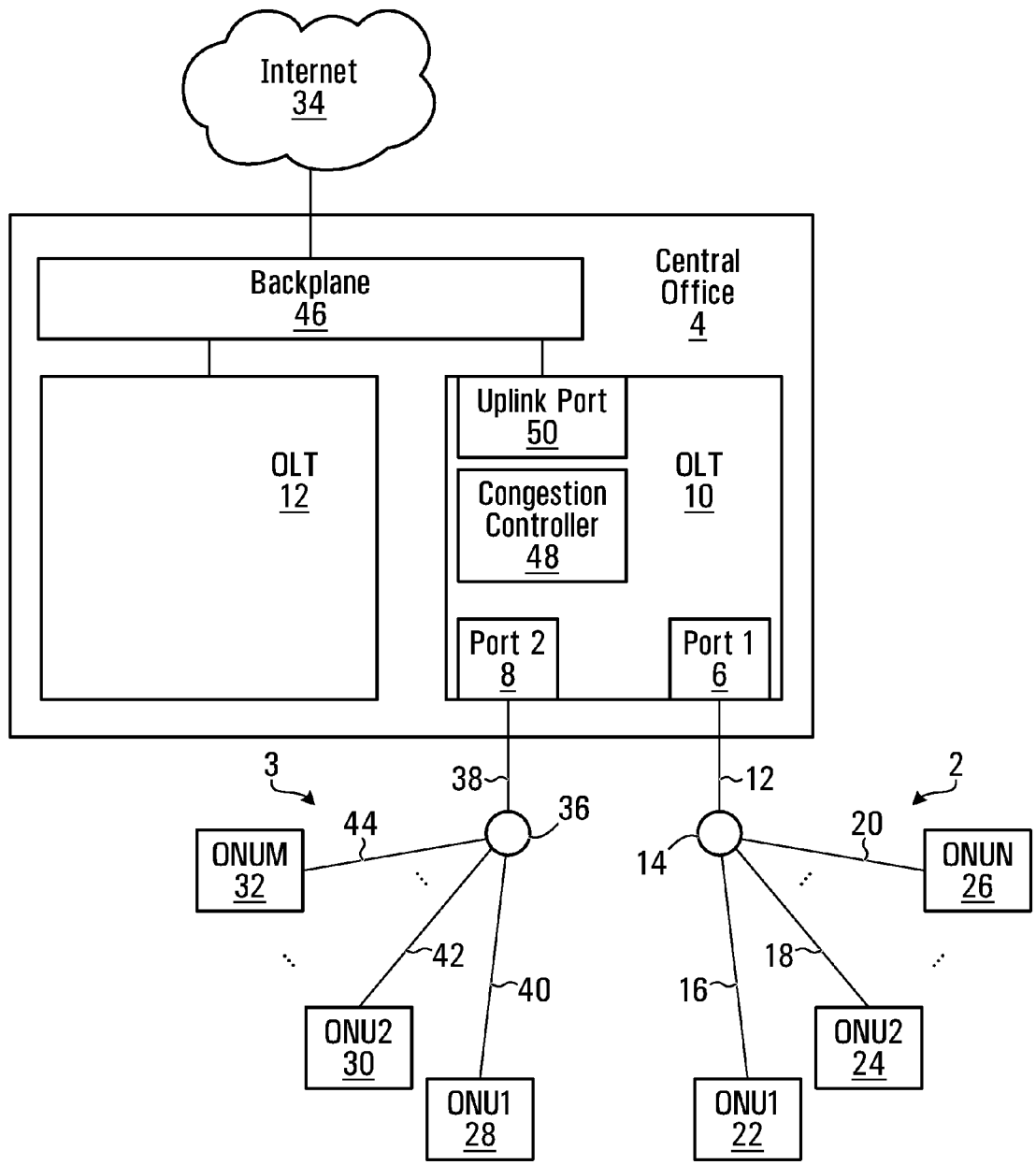
FIG. 1 is a block diagram illustrating a Central Office (CO) servicing several Passive Optical Networks (PONs)

Referring first to FIG. 1, a central office 4 is shown, which connects to several Passive Optical Networks (PONs). Only two PONs are illustrated for the sake of simplicity, although more or fewer PONs may be present. The two PONs specifically illustrated are PON 2 and PON 3. Each PON has a physical tree topology with an OLT 10 located at the root and ONUs connected to the leaf nodes of the tree.

The OLT 10 has two ports 6 and 8, labelled "Port 1" 6 and "Port 2" 8. These ports are typically referred to as "PON ports". Each of these PON ports is the interface between the OLT 10 and a PON. As illustrated in FIG. 1, OLT 10 interfaces with PON 2 through Port 1 and with PON 3 through Port 2. Specifically, Port 1 is connected to multiple ONUs 22, 24, and 26 through a 1:N optical splitter/combiner 14. In the illustrated example, there are N ONUs connected to OLT 10 through Port 1, but only three are illustrated, specifically labeled "ONU 1" 22, "ONU 2" 24, . . . , "ONU N" 26. A shared optical fiber 12 connects the OLT 10 to the 1:N optical splitter/combiner 14, and a respective optical fiber 16, 18, and 20 connects the 1:N optical splitter/combiner to each ONU 22, 24, and 26. Similarly, there are M ONUs connected to OLT 10 through Port 2, but again only three are illustrated, specifically labeled "ONU 1" 28, "ONU 2" 30, . . . , "ONU M" 32. Another shared optical fiber 38 connects the OLT 10 to the 1:M optical splitter/combiner 36, and a respective optical fiber 40, 42, and 44 connects the 1:M optical splitter/combiner to each ONU 28, 30, and 32.

The OLT 10 is the gateway that allows the ONUs serviced by each of Port 1 and Port 2 to connect to the Internet 34, and/or to other networks not shown (e.g. a private network), and/or to other OLTs, such as OLT 12. A backplane 46 acts as a switch that connects the OLT 10 to these other networks and equipment.

In the illustrated embodiment, the central office 4 also includes another OLT 12, which services other PONs (not shown). Although only OLT 12 is shown, it will be appreciated that other OLTs may also be included as part of the infrastructure of the central office 4, or that alternatively OLT 10 may be the only OLT in the central office 4. The details of OLT 12 have been omitted for the sake of clarity. In some embodiments, OLT 12 is present and operates in the same manner as OLT 10. The operation of OLT 10 will be explained in more detail below.

In the example PONs illustrated in FIG. 1, each of the illustrated ONUs may serve a single residential or business subscriber, referred to as Fiber-to-the-Home/Business (FTTH/B), or multiple subscribers, referred to as Fiber-to-the-curb (FTTC). Each of the illustrated ONUs may be connected to one or more devices, such as a telephone, computer, printer, media access device, tablet, router and/or television set.

Reference will now be made specifically to PON 2, which connects OLT 10 to ONUs 22, 24, and 26. Due to the directional properties of the optical splitter/combiner 14 of PON 2, the OLT 10 is able to broadcast data to all ONUs 22, 24, and 26 in the downstream direction. In the upstream direction, however, ONUs 22, 24, and 26 do not communicate directly with one another. Instead, each one of the ONUs 22, 24, and 26 is only able to send data to the OLT 10. Thus, in the downstream direction, the PON 2 may be viewed as a point-to-multipoint network, and in the upstream direction, the PON 2 may be viewed as a multipoint-to-point network.

For downstream traffic, the OLT 10 broadcasts content for all of the ONUs 22, 24, and 26 on a single broadcast channel. Addressing is used to identify the appropriate ONU for each packet of the content. For upstream traffic, the upstream bandwidth is time shared by all of the ONUs 22, 24, and 26, and only one ONU transmits data to the OLT 10 at a time to avoid traffic collision. The OLT 10 controls the time sharing of the bandwidth between the ONUs 22, 24, and 26 by allocating transmission windows to each ONU, during which each ONU is allowed to transmit upstream traffic. The transmission windows are granted using the time sharing scheme such that only one ONU can transmit to the OLT 10 at a time. When a new ONU (not shown) enters into the PON 2, the OLT 10 will not be aware of it and will not allocate any upstream capacity to it. To allow for new ONUs to join, the OLT 10 periodically allocates a "discovery window". The allocation is signalled on the downlink broadcast channel so that all ONUs, including a new ONU that has not yet registered, can receive it.

A multipoint control protocol (MPCP) is used to facilitate the allocation of transmission windows and the joining of new ONUs. An example of a MPCP is described in the EPON portion of the collection of standards under IEEE Std 802.3.

The OLT 10 and the ONUs 28, 30, and 32 of the PON 3 operate in the same manner as described above with respect to PON 2. That is, in the downstream direction, the PON 3 may be viewed as a point-to-multipoint network, and in the upstream direction, the PON 3 may be viewed as a multipoint-to-point network. A MPCP is used to control the time sharing of the bandwidth between the ONUs 28, 30, and 32, and to facilitate the joining of new ONUs.

The OLT 10 is an example of an OLT in accordance with one embodiment. As discussed above, the OLT 10 includes Port 1 and Port 2, which interface with PON 2 and PON 3 respectively. The OLT 10 also includes an uplink port 50 through which data received through each of Port 1 and Port 2 are transmitted to backplane 46. The OLT 10 further includes a congestion controller 48, which determines whether there is congestion of data in the OLT 10, and if so, modifies the enforced maximum upstream bandwidth for at least one of Port 1 and Port 2. The operation of the congestion controller 48 will be explained in more detail below.

Figure 2:
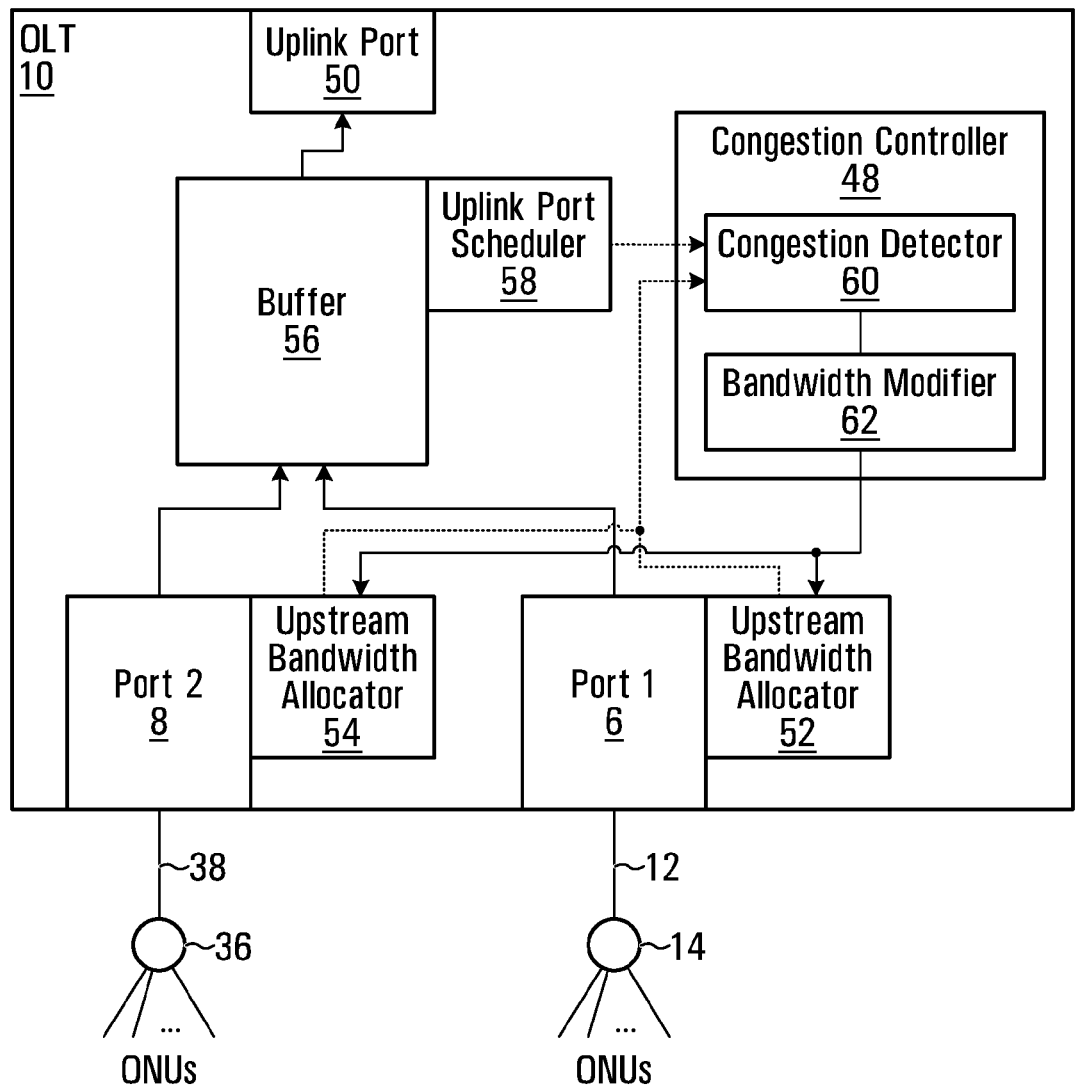
FIG. 2 is a block diagram illustrating an Optical Line Terminal (OLT)

FIG. 2 illustrates OLT 10 in greater detail. It will be appreciated that not all of the components described and illustrated in the OLT 10 are used in order to perform the methods described below. It will also be appreciated that other components of the OLT 10 may also be present, but have been omitted for the sake of clarity.

As discussed with respect to FIG. 1, the OLT 10 includes two ports, Port 1 and Port 2, designated by reference characters 6 and 8 respectively. Associated with each of Port 1 and Port 2 is a respective upstream bandwidth allocator 52 and 54.

The upstream bandwidth allocator 52 enforces a maximum upstream bandwidth for data received through Port 1 from ONUs 22, 24, and 26, and the upstream bandwidth allocator 54 enforces a maximum upstream bandwidth for data received through Port 2 from ONUs 28, 30, and 32.

The upstream bandwidth of each of Port 1 and Port 2 relates to the rate of upstream data transfer through that port. Thus, the upstream bandwidth can (and likely will) change over time depending upon the amount of data to be transmitted from the ONUs associated with the port. A maximum upstream bandwidth can be and is enforced for Port 1 and Port 2 by upstream bandwidth allocators 52 and 54 respectively. The enforced maximum upstream bandwidth for Port 1 is the maximum upstream bandwidth that is enforced at Port 1 by upstream bandwidth allocator 52, regardless of the of the amount of data waiting to be transmitted from the ONUs connected to Port 1 (e.g. ONUs 22, 24, and 26), and regardless of the channel capacity of Port 1. Similarly, the enforced maximum upstream bandwidth for Port 2 is the maximum upstream bandwidth that is enforced at Port 2 by upstream bandwidth allocator 54, regardless of the of the amount of data waiting to be transmitted from the ONUs connected to Port 2 (e.g. ONUs 28, 30, and 32), and regardless of the channel capacity of Port 2.

Thus, enforcing a maximum upstream bandwidth for a port entails ensuring that the upstream bandwidth for that port is equal to or less than a maximum value, regardless of the amount of data waiting to be transmitted from the ONUs connected to that port and regardless of the channel capacity of that port. One example of a method of enforcing a maximum upstream bandwidth for a port is to limit the number of transmission windows granted to the ONUs connected to that port and/or limit the length of one or more of the transmission windows granted to the ONUs connected to that port.

Typically, the maximum upstream bandwidth enforced by upstream bandwidth allocator 52 is comparable to the channel capacity of Port 1, and the maximum upstream bandwidth enforced by upstream bandwidth allocator 54 is comparable to the channel capacity of Port 2. However, as will be described in the embodiments below, the maximum upstream bandwidth enforced for each of Port 1 and Port 2 can be set to a lower value by upstream bandwidth allocators 52 and 54 to help alleviate congestion of data waiting for transmission through uplink port 50.

In some embodiments, the upstream bandwidth allocators 52 and 54 each implement a respective dynamic bandwidth allocation (DBA) algorithm, which performs enforcement of a maximum upstream bandwidth in accordance with a respective MPCP. For example, in one embodiment, the upstream bandwidth allocator 52 can grant transmission windows to each of ONUs 22, 24, and 26. If the upstream bandwidth allocator 52 wishes to reduce the maximum upstream bandwidth at Port 1, the upstream bandwidth allocator 52 can reduce the length of the transmission windows it grants and/or reduce the number of transmission windows that it grants to one, some or all of ONUs 22, 24, and 26. Example methods for achieving this will be described in detail later. Similarly, upstream bandwidth allocator 54 can reduce the maximum upstream bandwidth at Port 2 by reducing the length of the transmission windows it grants and/or reducing the number of transmission windows that it grants to one, some or all of ONUs 28, 30, and 32.

Data received from ONUs 22, 24, and 26 through Port 1 are forwarded to buffer 56. Similarly, data received from ONUs 28, 30, and 32 through Port 2 are also forwarded to buffer 56. The data received at buffer 56 is stored until it is scheduled for transmission through uplink port 50 by uplink port scheduler 58. In some embodiments, as the data is received in the buffer 56, it is separated into different queues (not shown) depending on the class of the data.

The uplink port scheduler 58 controls the transmission of the data from the buffer 56 and through the uplink port 50 at least in part in accordance with the channel capacity of the uplink port 50. In other words, only so much data can be physically transmitted through the uplink port 50 during a given period of time, and this data rate is enforced by the uplink port scheduler 58. Therefore, the uplink port scheduler 58 also enforces a maximum upstream bandwidth through uplink port 50, which is comparable to channel capacity of uplink port 50 (in general it will not be exactly the same as the channel capacity due to overhead, although in some embodiments it may be).

The OLT 10 further includes congestion controller 48, which includes a congestion detector 60 and a bandwidth modifier 62. The purpose of the congestion controller 48 is to detect congestion of data to be transmitted through uplink port 50 (via congestion detector 60), and if congestion is detected, to modify the enforced maximum upstream bandwidth (via bandwidth modifier 62) at at least one of Port 1 and Port 2 in order attempt to alleviate the congestion. The congestion controller 48 is shown as a separate hardware unit in FIG. 2. In other embodiments, the congestion controller 48 can instead be implemented in uplink port scheduler 58, upstream bandwidth allocator 52 or upstream bandwidth allocator 54.

Figure 3:
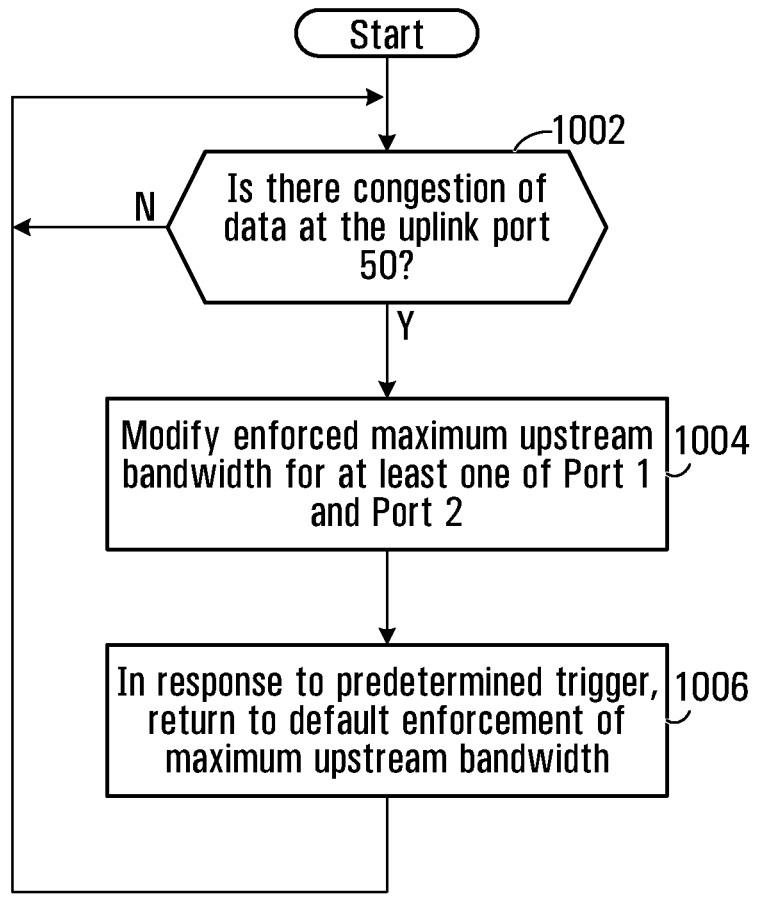
FIG. 3 is a flow chart of a method of congestion control.

The operation of the congestion controller 48 is described in more detail in relation to FIG. 3. It will be appreciated that in some embodiments, instructions for implementing this method may be stored on a computer readable medium, and that the instructions can be executed by the congestion controller 48 (or more generally, by one or more processing units) in the OLT 10.

In step 1002, the congestion detector 60 determines whether there is congestion of data to be transmitted through the uplink port 50. If not, step 1002 is repeated on a periodic basis. However, if so, the method proceeds to step 1004 in which the bandwidth modifier 62 modifies the enforced maximum upstream bandwidth for at least one of Port 1 and Port 2. For example, in one embodiment, the bandwidth modifier 62 instructs upstream bandwidth allocators 52 and 54 to each reduce the maximum upstream bandwidth enforced at their port in order to reduce the inflow of data to buffer 56.

In step 1006, in response to a predetermined trigger, the enforced maximum upstream bandwidth is no longer modified by bandwidth modifier 62, but is returned to its default enforcement. Examples of predetermined triggers include, but are not limited to: congestion detector 60 determining that there is no longer congestion, the passage of a predetermined amount of time after congestion is initially detected by congestion detector 60, the end of a cycle of a DBA algorithm, and the resetting of the OLT 10 or any other equipment that would substantively affect the amount of data being received at the buffer 56.

There are multiple ways of determining if there is congestion of data (step 1002), as well as multiple ways of reducing the maximum upstream bandwidth enforced at at least one of Port 1 and Port 2 (step 1004). Therefore, specific example embodiments will be explained below.

Considering step 1002 in more detail, as mentioned above, there are multiple ways in which the congestion detector 60 can determine whether there is congestion of data to be transmitted through the uplink port 50. As an initial matter, what constitutes "congestion" of data is defined on an implementation specific basis. For example, congestion does not necessarily mean that the data in buffer 56 is congested to the point that there is a slow down in performance or packet drops (although this may be the case). Congestion of the data may occur, for example, when conditions are in place that presently cause, or will cause if continued, an unacceptable backlog of data to be transmitted through the uplink port 50. The following are examples of ways in which "congestion" of the data may be detected by congestion detector 60.

(1) The congestion detector 60 or uplink port scheduler 58 can directly read a hardware interface at buffer 56 that indicates the amount of data stored in the buffer 56. Once the amount of data in the buffer 56 is above a predetermined value, the congestion detector 60 determines that there is congestion. The predetermined value is implementation specific and may be modifiable on an application or customer specific basis. For example, in one embodiment, the predetermined value is 70%. That is, congestion is detected if the buffer 56 is greater than 70% full. Once the amount of data in the buffer 56 drops below another (modifiable) predetermined value (e.g. below 60% full, as one example), congestion is no longer indicated by congestion detector 60 and the enforced maximum upstream bandwidth is no longer modified, but is returned to its default enforcement (step 1006). In FIG. 2, the stippled arrow between uplink port scheduler 58 and congestion detector 60 illustrates this one possible method of detecting congestion. The stippled line represents communication between the congestion detector 60 and the buffer 56.

(2) The congestion detector 60 can monitor the total upstream traffic rate at each of Port 1 and Port 2. Specifically, the upstream traffic rate at each of Port 1 and Port 2 is measured, and the congestion detector 60 sums each of these traffic rates to obtain a total upstream traffic rate. If this total upstream traffic rate is above a predetermined value, then the congestion detector 60 determines that there is congestion. Once the total upstream traffic rate drops below another predetermined value for a predetermined duration of time, congestion is no longer indicated by congestion detector 60 and the enforced maximum upstream bandwidth is no longer modified, but is returned to its default enforcement (step 1006). The stippled line between congestion detector 60 and upstream bandwidth allocators 52 and 54 illustrates this one possible method of detecting congestion. The stippled lines represent communication between the congestion detector 60 and the upstream bandwidth allocators 52 and 54, which allows the upstream traffic rates from each of allocators 52 and 54 to be transmitted to congestion detector 60.

(3) The congestion detector 60 monitors whether packet drops are occurring in the OLT 10 in the upstream direction. If so, the congestion detector 60 determines that there is congestion if the number of packet drops is greater than a predetermined value within a predetermined period of time. If congestion is detected, then once the number of packet drops falls below another predetermined value within a predetermined period of time, then congestion is no longer indicated by the congestion detector 60 and the enforced maximum upstream bandwidth is no longer modified, but is returned to its default enforcement (step 1006).

The above are three examples of determining whether there is congestion of data to be transmitted through the uplink port 50. However, as mentioned above, detection of "congestion" is defined on an implementation specific basis.

Once it has been determined that there is congestion, the enforced maximum upstream bandwidth for at least one of Port 1 and Port 2 is modified in order to reduce the total amount of data received at buffer 56. That is, step 1004 of FIG. 3 is performed. There are multiple ways of modifying the enforced maximum upstream bandwidth for at least one of Port 1 and Port 2. Some example embodiments for achieving this are discussed below.

In one example embodiment, the bandwidth modifier 62 instructs each one of the upstream bandwidth allocators 52 and 54 to reduce the number of transmission windows it grants during a given period of time, such as in a given cycle. In another example embodiment, the bandwidth modifier 62 instructs only one of upstream bandwidth allocators 52 and 54 to reduce the number of transmission windows it grants during a given period of time. In yet another example embodiment, the bandwidth modifier 62 instructs each one of the upstream bandwidth allocators 52 and 54 to reduce the duration of one or more transmission windows it grants to one or more ONUs. In still another example embodiment, the bandwidth modifier 62 instructs only one of upstream bandwidth allocators 52 and 54 to reduce the duration of one or more transmission windows it grants to one or more ONUs.

In a specific example embodiment, the upstream bandwidth allocators 52 and 54 each implement a respective associated DBA algorithm. Each DBA algorithm has an associated "upstream bandwidth capacity" parameter. The bandwidth modifier 62 instructs each one of upstream bandwidth allocators 52 and 54 to adjust its upstream bandwidth capacity parameter to reduce the maximum upstream bandwidth enforced at its port. This particular example embodiment will be described in more detail later in conjunction with FIGS. 4-8.

The specific method for determining the amount by which the enforced maximum upstream bandwidth is reduced in step 1004 can be implemented multiple ways. A few specific examples are explained below.

(1) In some embodiments, the upstream bandwidth of the uplink port 50 is evenly divided into sub-bandwidths, each sub-bandwidth corresponding to a respective one of Ports 1 and 2. The maximum upstream bandwidth enforced at each of Ports 1 and 2 is then adjusted (typically reduced) to enforce the associated sub-bandwidth. For example, assume the maximum upstream bandwidth of the uplink port 50 is 10 Gigabits per second (Gbps), then the maximum upstream bandwidth enforced by each of upstream bandwidth allocators 52 and 54 is reduced such that a maximum upstream bandwidth of 5 Gbps (10 Gbps divided by 2 ports) is enforced for each of Ports 1 and 2.

(2) In some embodiments, the maximum upstream bandwidth enforced at each of Ports 1 and 2 is reduced by a fixed value, that is, the same predetermined value for each port. However, the reduction does not necessarily result in the sum of the maximum upstream bandwidths enforced at each of Ports 1 and 2 being equal to the maximum upstream bandwidth of the uplink port 50 (as in (1) above). For example, the maximum upstream bandwidth enforced at each of Ports 1 and 2 may be reduced by 1 Gbps.

(3) In some embodiments, the upstream bandwidth of the uplink port 50 is divided into a plurality of sub-bandwidths, each sub-bandwidth corresponding to a respective one of Ports 1 and 2. The value of each sub-bandwidth is proportional to the number of active ONUs connected to the Port associated with that sub-bandwidth. The maximum upstream bandwidth enforced at each of Ports 1 and 2 is then adjusted (typically reduced) to enforce the associated sub-bandwidth. For example, if the maximum upstream bandwidth of the uplink port 50 is 12 Gbps, and Port 1 has 256 active ONUs connected thereto, and Port 2 has 128 active ONUs connected thereto, then the upstream bandwidth allocator 52 enforces a maximum upstream bandwidth at Port 1 of 8 Gbps, and the upstream bandwidth allocator 54 enforces a maximum upstream bandwidth at Port 2 of 4 Gbps. Since Port 1 has twice as many active ONUs connected thereto as Port 2, the maximum upstream bandwidth enforced at each one of Ports 1 and 2 is reduced such that the maximum upstream bandwidth enforced at Port 1 is twice as high as the maximum upstream bandwidth enforced at Port 2. Note that an "active" ONU refers to one that is actively requesting to send traffic. This may be different from a "registered" ONU, which is an ONU that is registered with the OLT 10, but may not be active (e.g. may not be actively sending data to the OLT 10). As will be appreciated, in other embodiments, the upstream bandwidth of the uplink port 50 can instead be divided into sub-bandwidths proportionally in accordance with the number of registered ONUs (versus active ONUs) connected to each of Ports 1 and 2.

(4) In some embodiments, the maximum upstream bandwidth enforced at each of Ports 1 and 2 is reduced by a value proportional to the number of active or registered ONUs associated with that Port. However, the reduction does not necessarily result in the sum of the maximum upstream bandwidths enforced at each of Ports 1 and 2 being equal to the maximum upstream bandwidth of the uplink port 50 (as in (3) above). For example, if there are twice as many active or registered ONUs connected to Port 1 as compared to Port 2, the maximum upstream bandwidth enforced at Port 1 may be reduced by half as much as the maximum upstream bandwidth enforced at Port 2.

(5) In some embodiments, the amount by which the enforced maximum upstream bandwidth is reduced for each one of Ports 1 and 2 is proportional to the sum of the amount of data that each ONU connected to each of Ports 1 and 2 is requesting to transmit to the Port. For example, if for a given period of time (e.g. a DBA algorithm cycle) the total amount of bandwidth being requested from the ONUs connected to Port 1 is twice as much as the total amount of bandwidth being requested from the ONUs connected to Port 2, then the bandwidth modifier 62 will instruct the upstream bandwidth allocator 52 to reduce the maximum upstream bandwidth enforced at Port 1 by half as much as the value the bandwidth modifier 62 instructs the upstream bandwidth allocator 54 to reduce the maximum upstream bandwidth enforced at Port 2.

(6) In some embodiments, the upstream bandwidth of the uplink port 50 is divided into a plurality of sub-bandwidths, each sub-bandwidth corresponding to a respective one of Ports 1 and 2. The value of each sub-bandwidth is proportional to the sum of the amount of data requested from the ONUs connected to the Port associated with that sub-bandwidth. The maximum upstream bandwidth enforced at each of Ports 1 and 2 is then adjusted (typically reduced) to enforce the associated sub-bandwidth.

(7) In some embodiments, the amount by which the enforced maximum upstream bandwidth is reduced for each one of Ports 1 and 2 is proportional to the upstream traffic rate measured at each of Ports 1 and 2. For example, if the upstream traffic rate measured at Port 1 is twice as much as the upstream traffic rate measured Port 2, then the bandwidth modifier 62 will instruct the upstream bandwidth allocator 52 to reduce the maximum upstream bandwidth enforced at Port 1 by half as much as the value the bandwidth modifier 62 instructs the upstream bandwidth allocator 54 to reduce the maximum upstream bandwidth enforced at Port 2.

(8) In some embodiments, the upstream bandwidth of the uplink port 50 is divided into a plurality of sub-bandwidths, each sub-bandwidth corresponding to a respective one of Ports 1 and 2. The value of each sub-bandwidth is proportional to the upstream traffic rate measured at the corresponding Port. The maximum upstream bandwidth enforced at each of Ports 1 and 2 is then adjusted (typically reduced) to enforce the associated sub-bandwidth.

(9) In some embodiments, the amount by which the enforced maximum upstream bandwidth is reduced for each one of Ports 1 and 2 is proportional to the sum of the Peak Information Rate (PIR) assigned to each ONU connected to Ports 1 and 2. The PIR is a value assigned to each ONU by the network operator. The PIR specifies the maximum rate at which the ONU is allowed to transmit data to the OLT. For example, if the sum of the PIR of each of the ONUs connected to Port 1 is twice as much as the sum of the PIR of each of the ONUs connected to Port 2, then the bandwidth modifier 62 will instruct the upstream bandwidth allocator 52 to reduce the maximum upstream bandwidth enforced at Port 1 by half as much as the value the bandwidth modifier 62 instructs the upstream bandwidth allocator 54 to reduce the maximum upstream bandwidth enforced at Port 2.

(10) In some embodiments, the upstream bandwidth of the uplink port 50 is divided into a plurality of sub-bandwidths, each sub-bandwidth corresponding to a respective one of Ports 1 and 2. The value of each sub-bandwidth is proportional to the sum of the PIR assigned to each ONU connected to the corresponding Port. The maximum upstream bandwidth enforced at each of Ports 1 and 2 is then adjusted (typically reduced) to enforce the associated sub-bandwidth.

(11) In some embodiments, the amount by which the enforced maximum upstream bandwidth is reduced for each one of Ports 1 and 2 is proportional to the sum of the Committed Information Rate (CIR) assigned to each ONU connected to Ports 1 and 2. The CIR is a value assigned to each ONU by the network operator. The CIR specifies the minimum rate at which the ONU is guaranteed to transmit data to the OLT. For example, if the sum of the CIR of each of the ONUs connected to Port 1 is twice as much as the sum of the CIR of each of the ONUs connected to Port 2, then the bandwidth modifier 62 will instruct the upstream bandwidth allocator 52 to reduce the maximum upstream bandwidth enforced at Port 1 by half as much as the value the bandwidth modifier 62 instructs the upstream bandwidth allocator 54 to reduce the maximum upstream bandwidth enforced at Port 2.

(12) In some embodiments, the upstream bandwidth of the uplink port 50 is divided into a plurality of sub-bandwidths, each sub-bandwidth corresponding to a respective one of Ports 1 and 2. The value of each sub-bandwidth is proportional to the sum of the CIR assigned to each ONU connected to the corresponding Port. The maximum upstream bandwidth enforced at each of Ports 1 and 2 is then adjusted (typically reduced) to enforce the associated sub-bandwidth.

It will be appreciated that a combination of some of (1) to (12) described above can also be used to determine the amount by which the enforced maximum upstream bandwidth is reduced in step 1004.

Any one of options (1) to (12), or some combination thereof, may be implemented. For example, in one embodiment, options (3), (6), (10), and (12), may be implemented.

Further to the above, specific examples will now be described in detail below in the context of an Ethernet Passive Optical Network (EPON).

Figure 4:
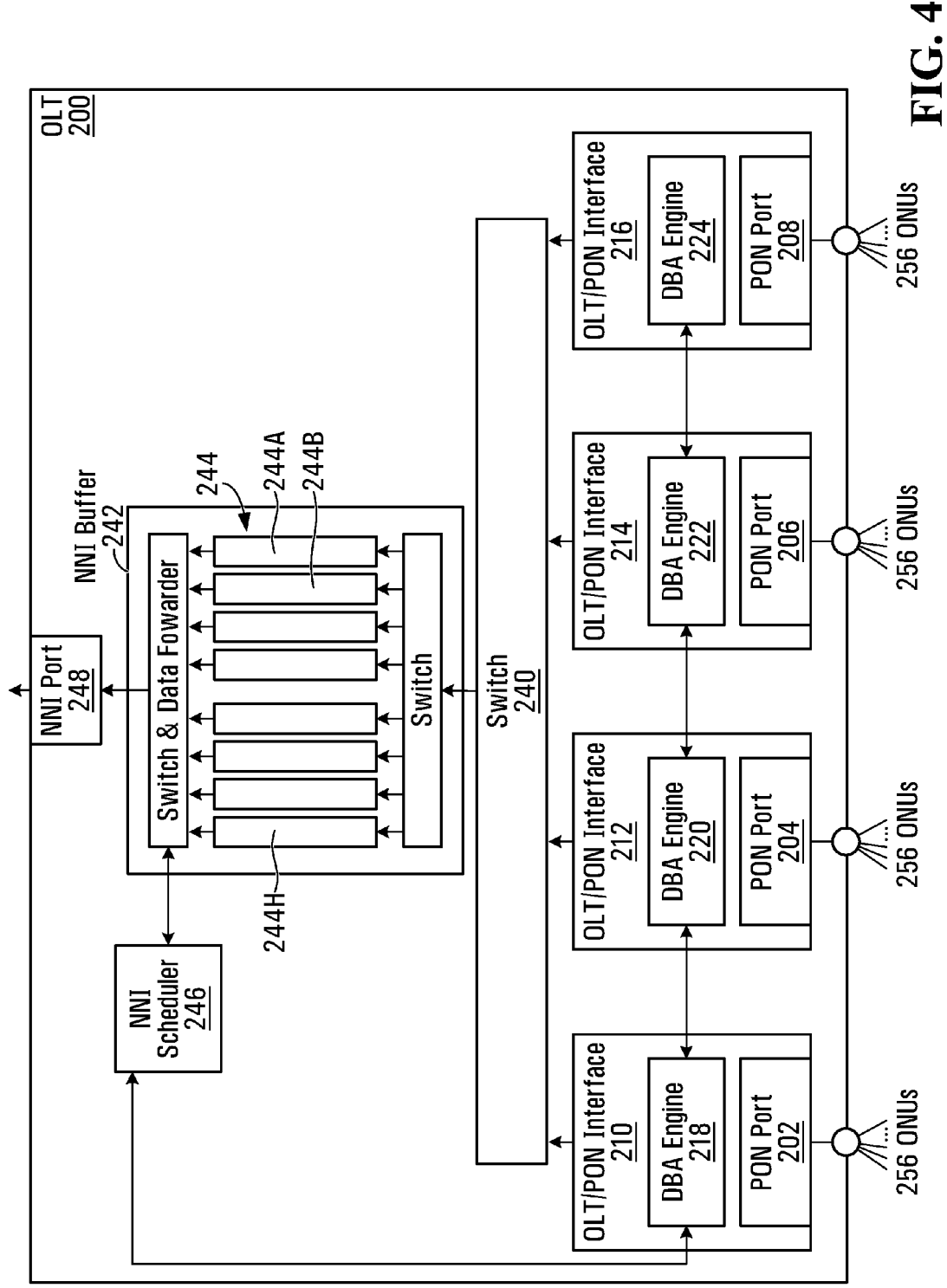
FIG. 4 is a block diagram illustrating another OLT.

Turning therefore to FIG. 4, another OLT 200 is illustrated. The OLT 200 can be considered a specific example of the OLT 10 illustrated in FIG. 1, although in this particular example four PON ports are included in OLT 200, rather than two PON ports, as illustrated in OLT 10.

It will be appreciated that not all the components illustrated and described in the OLT 200 are used in order to perform the methods described herein. It will also be appreciated that other components of the OLT 200 may also be present, but have been omitted for the sake of clarity.

As shown in FIG. 4, the OLT 200 includes four PON ports, PON port 202, PON port 204, PON port 206, and PON port 208. Each one of these PON ports connects the OLT 200 to a respective passive optical network that serves a plurality of ONUs. In the illustrated example, each PON port has 256 ONUs connected thereto.

Each of PON ports 202, 204, 206, and 208 is part of a respective OLT/PON interface. Specifically, PON port 202 is included as part of OLT/PON interface 210, PON port 204 is included as part of OLT/PON interface 212, PON port 206 is part of OLT/PON interface 214, and PON port 208 is part of OLT/PON interface 216. The OLT/PON interfaces include hardware and modules necessary to effect communication between the OLT 200 and the ONUs.

Figure 5:
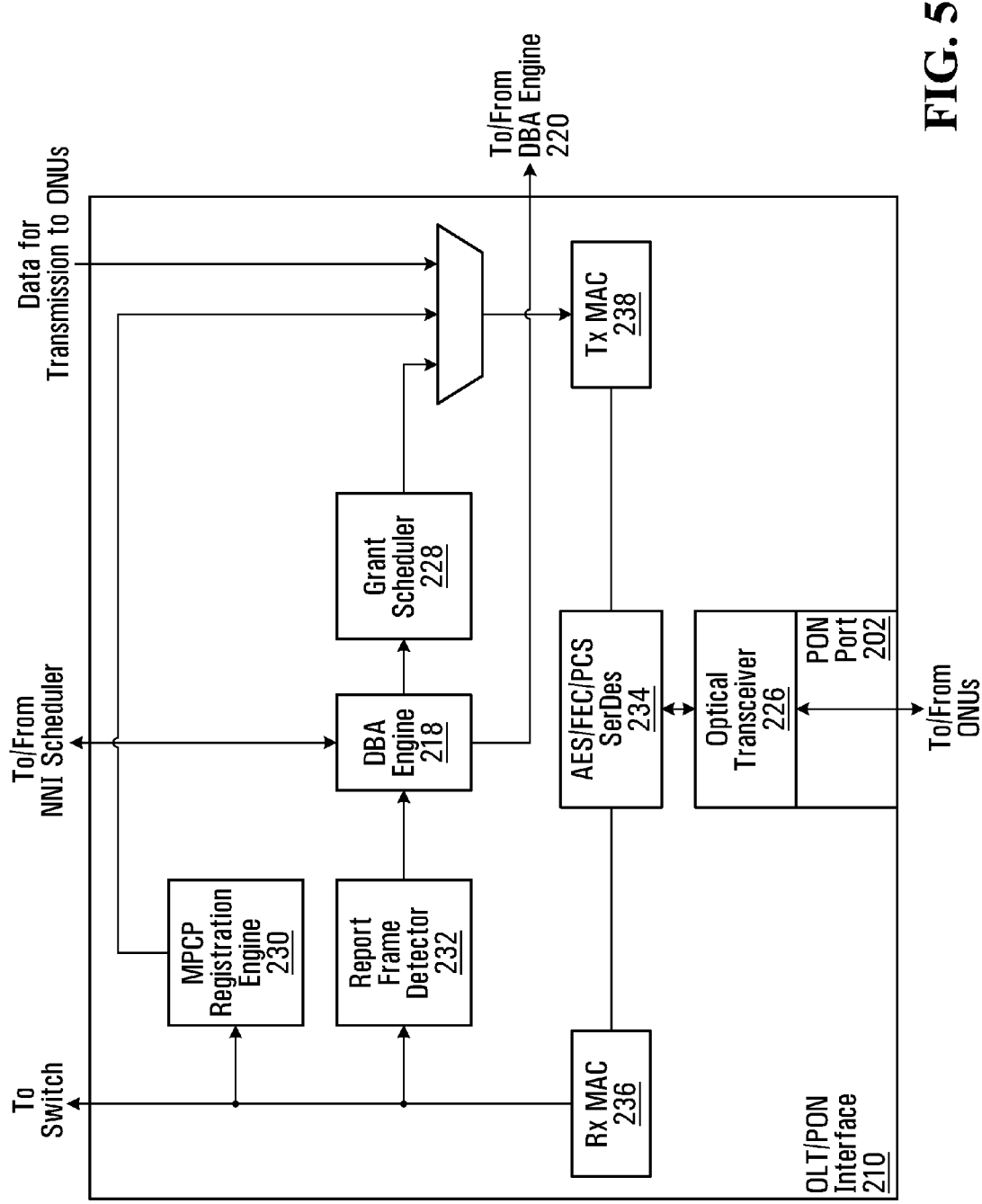
FIG. 5 is a block diagram showing in more detail an OLT/PON interface in FIG. 4.

OLT/PON interface 210 is shown in greater detail in FIG. 5. It will be appreciated that not all the components illustrated and described in the OLT/PON interface 210 are used in order to perform the methods described herein. It will also be appreciated that other components of the OLT/PON interface 210 may also be present, but have been omitted for the sake of clarity.

The OLT/PON interface 210 includes a dynamic bandwidth allocation (DBA) engine 218 that enforces a maximum upstream bandwidth for data received on the PON port 202. The DBA engine 218 performs this enforcement in accordance with a multipoint control protocol (MPCP). As mentioned earlier, an example of a MPCP is described in the EPON portion of the collection of standards under IEEE Std 802.3.

As part of the MPCP protocol in the illustrated example, MPCP frames are received by and generated in the OLT/PON interface 210. The MPCP frames that are generated in the OLT/PON interface 210 include:

1) 'GATE' messages—each GATE message defines one or more transmission windows during which a particular ONU serviced by the PON port 202 is permitted to transmit data to the OLT 200. These GATE messages are generated in Grant Scheduler 228, which is controlled by the DBA engine 218. The DBA engine 218 controls generation of transmission windows dynamically taking into consideration the amount of data requested to be transmitted by each of the ONUs. The DBA engine 218 also ensures that the multiple ONUs serviced by the PON port 202 do not transmit data to the OLT 200 at the same time.

2) 'DISCOVERY_GATE' messages—each DISCOVERY_GATE message defines a discovery window that allows a newly connected or offline ONU to register with the OLT 200 via PON port 202. DISCOVERY_GATE messages are generated by the MPCP Registration Engine 230.

3) 'REGISTER' messages—a 'REGISTER' message is transmitted from the OLT 200 to a particular ONU connected to the PON port 202 as part of the registration handshaking process when the ONU first registers with the OLT 200. REGISTER messages are also generated by the MPCP Registration Engine 230.

It is the GATE messages that allow the DBA engine 218 to enforce a maximum upstream bandwidth at the PON port 202. If the DBA engine 218 wishes to reduce the upstream bandwidth, the DBA engine 218 can reduce the length and/or number of the transmission windows it grants (via the grant scheduler 228) to one or more of the ONUs connected to the PON port 202. Example methods for achieving this will be described in detail later.

The MPCP frames that are received at the OLT/PON interface 210 via PON port 202 include:

1) 'REPORT' messages—these messages are transmitted by each of the ONUs. Each REPORT message provides information to the OLT/PON interface 210 that is representative of the amount of data waiting to be transmitted to the OLT 200 from the ONU that sent the REPORT message. These REPORT messages are extracted by the REPORT Frame Detector 232 in the OLT/PON interface 210. The DBA engine 218 uses the information in the REPORT messages when granting duration and periodicity of transmission windows in GATE messages. The REPORT message may provide other information also, such as a time stamp used by the OLT 200 for round-trip-time calculations.

2) 'REGISTER_REQ' AND 'REGISTER_ACK' messages—these messages are received by the OLT/PON interface 210 from a particular ONU as part of the registration handshaking process when the ONU first registers with the OLT 200. These messages are processed by the MPCP Registration Engine 230.

Other components of the OLT/PON interface 210 include the AES/FEC/PCS/SerDes block 234, the Rx MAC block 236, and the Tx MAC block 238. The AES/FEC/PCS/SerDes block 234 implements physical layer functions, such as the physical coding sublayer, encryption/decryption, error control coding, and serialization/deserialization. All of these functions are illustrated as one block simply for clarity of illustration. The Rx MAC block 236 maps the received data into frames readable by higher layers in the OLT/PON interface 210, and the Tx MAC block 238 removes such frames.

OLT/PON interfaces 212, 214, and 216 have a structure similar to OLT/PON interface 210, and therefore they will not be illustrated or described in detail.

Returning now to FIG. 4, data received from the ONUs through PON port 202 are forwarded to Network-to-Network Interface (NNI) buffer 242 via switch 240. Similarly, data received at PON ports 204, 206, and 208 are also forwarded to buffer 242 via switch 240. The switch 240 is sometimes also referred to as a "forwarding engine", and its job is to facilitate the collection of data from multiple PON ports at a single buffer (buffer 242). As the data is received in the buffer 242, it is not separated in terms of which PON port it was received on, but is separated into one of eight queues 244 depending on the class of the data. For example, queue 244A may be video data, and queue 244H may be voice data. The NNI scheduler 246 controls the transmission of the data from each of the eight queues through the NNI port 248 (e.g. an XAUI port). The NNI port 248 is an uplink port that connects to a backplane (not shown) in the central office in which the OLT 200 resides. The backplane connects to other networks (such as the Internet) and/or to other OLTs. The NNI scheduler 246 schedules data transmission through the NNI port at least in part in accordance with the channel capacity of the NNI port 248. In other words, only so much data can be transmitted through the NNI port 248 during a given period of time, and this data rate is enforced by the NNI scheduler 246. Although the "Switch and Data Forwarder" function is illustrated as part of buffer 242 in FIG. 4, it may instead be part of NNI scheduler 246.

The NNI scheduler 246 is able to communicate with DBA engine 218 of OLT/PON interface 210. As will be explained below, in one embodiment, the NNI scheduler 246 can inform the DBA engine 218 if congestion of data in the NNI buffer 242 occurs. The DBA engine 218 can then reduce the enforced maximum upstream bandwidth at its PON port 202, and/or instruct the DBA engines of the other OLT/PON interfaces (DBA engines 220, 222, and 224) to reduce the maximum upstream bandwidth enforced at their respective PON ports. By reducing the maximum upstream bandwidth at the PON ports, this will help alleviate congestion of data in the NNI buffer 242, since less data is permitted to be transmitted from the ONUs connected to the PON ports.

Figure 6:
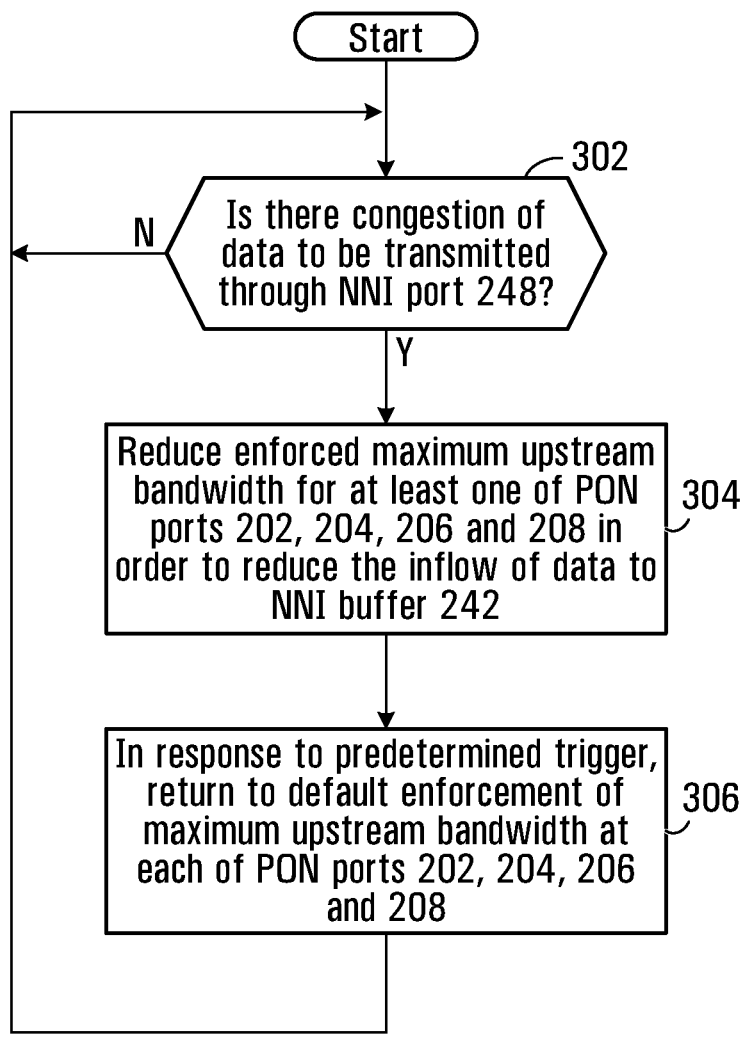
FIG. 6 is a flow chart of another method of congestion control.

Further to the above, congestion control will now be described in more detail with reference to FIG. 6.

In step 302, it is determined whether there is congestion of data to be transmitted through the NNI uplink port 248. If not, step 302 is repeated on a periodic basis. However, if so, the method proceeds to step 304 in which the enforced maximum upstream bandwidth for at least one of PON ports 202, 204, 206, and 208 is reduced in order to reduce the inflow of data to buffer 242. In step 306, once congestion is no longer detected, or more generally, in response to a predetermined trigger, the enforced maximum upstream bandwidth is no longer modified, but is returned to its default enforcement. Examples of predetermined triggers include, but are not limited to: an indication that there is no longer congestion, the passage of a predetermined amount of time after congestion is initially detected, the end of a cycle of a DBA algorithm, and the resetting of the OLT 200, or any portion of the OLT/PON interface 210 or ONUs that would substantively affect the amount of data being received at the NNI buffer 242.

There are multiple ways of determining if there is congestion of data (step 302), as well as multiple ways of reducing the enforced maximum upstream bandwidth for at least one of the PON ports (step 304). Therefore, specific example embodiments will be explained below.

Considering step 302 in more detail, as mentioned above, there are multiple ways of determining whether there is congestion of data to be transmitted through the NNI uplink port 248. As an initial matter, as discussed earlier, what constitutes "congestion" of data is defined on an implementation specific basis. For example, congestion does not necessarily mean that the data in buffer 242 is congested to the point that there is a slow down in performance or packet drops (although this may be the case). Congestion of the data may occur, for example, when conditions are in place that presently cause, or will cause if continued, an unacceptable backlog of data to be transmitted through the NNI uplink port 248. The following are examples of ways in which "congestion" of the data may be detected.

(1) A congestion detector in OLT 200 can directly read a hardware interface at NNI buffer 242 that indicates the amount of data stored in the NNI buffer 242. Once the amount of data in the NNI buffer 242 is above a predetermined value, the congestion detector determines that there is congestion. For example, in one embodiment, congestion is detected if the NNI buffer 242 is greater than 70% full. Once the amount of data in the NNI buffer 242 drops below another predetermined value (e.g. below 60% full), congestion is no longer indicated and the enforced maximum upstream bandwidth is no longer modified, but is returned to its default enforcement (step 306). The congestion detector is not specifically illustrated in FIG. 4 since multiple locations of the congestion detector are possible. For example, in some embodiments, the congestion detector is part of the NNI scheduler 246. In other embodiments, the congestion detector is part of the DBA engine 218. In yet other embodiments, the congestion detector is a separate hardware module in and of itself located in the OLT 200.

(2) A congestion detector in the OLT 200 monitors the total upstream traffic rate from each of the PON ports. Specifically, the upstream traffic rate of each of PON ports 202, 204, 206, and 208 is measured, and the congestion detector sums each of these traffic rates to obtain a total upstream traffic rate. If this total upstream traffic rate is above a predetermined value, then the congestion detector determines that there is congestion. Once the total upstream traffic rate drops below another predetermined value for a predetermined duration of time, congestion is no longer indicated and the enforced maximum upstream bandwidth is no longer modified, but is returned to its default enforcement (step 306).

(3) A congestion detector monitors whether packet drops are occurring in the OLT 200 in the upstream direction. If so, the congestion detector determines that there is congestion if the number of packet drops is greater than a predetermined value within a predetermined period of time. If congestion is detected, then once the number of packet drops falls below another predetermined value within a predetermined period of time, then congestion is no longer indicated and the enforced maximum upstream bandwidth is no longer modified, but is returned to its default enforcement (step 306).

The above are three examples of determining whether there is congestion of data to be transmitted through the NNI uplink port 248. However, as mentioned above, detection of "congestion" is defined on an implementation specific basis.

Once it has been determined that there is congestion, the enforced maximum upstream bandwidth for at least one of the PON ports is reduced in order to reduce the total amount of data received at buffer 242. That is, step 304 of FIG. 6 is performed. There are multiple ways of reducing the enforced maximum upstream bandwidth for at least one of the PON ports. Some example embodiments for achieving this are discussed below.

In one example embodiment, the DBA engine of each of at least one of PON ports 202, 204, 206, and 208, reduces the number of transmission windows it grants (e.g. via MPCP GATE messages) during a given period of time, such as in a given cycle of the DBA algorithm. In another example embodiment, the DBA engine of each of at least one of PON ports 202, 204, 206, and 208, reduces the duration of one or more transmission windows it grants to one or more ONUs.

In one specific example embodiment, an "upstream bandwidth capacity" parameter of each DBA algorithm associated with each of PON ports 202, 204, 206, and 208 is adjusted to reduce the maximum total upstream bandwidth enforced at each of the PON ports 202, 204, 206, and 208. This is described in more detail below.

As mentioned earlier, DBA engine 218 implements a DBA algorithm that is responsible for allocating transmission windows to each of the ONUs wishing to transmit data to PON port 202. Similarly, DBA engine 220 implements a DBA algorithm that is responsible for allocating transmission windows to each of the ONUs wishing to transmit data to PON port 204, DBA engine 222 implements a DBA algorithm that is responsible for allocating transmission windows to each of the ONUs wishing to transmit data to PON port 206, and DBA engine 224 implements a DBA algorithm that is responsible for allocating transmission windows to each of the ONUs wishing to transmit data to PON port 208. An example DBA algorithm implemented by DBA engine 218 is explained below, it being appreciated that the DBA algorithms implemented by DBA engine 220, 222, and 224 can operate in a similar manner.

The DBA algorithm implemented in DBA engine 218 separates time into intervals or cycles. During each cycle, transmission windows are granted to the ONUs connected to PON port 202. For example, a cycle may be 1 ms. In a given cycle, there is overhead that can be subtracted from the total time in the cycle during which data can be received from ONUs. Examples of overhead include the time during which REPORT packets are beings transmitted to the OLT 200 from the ONUs, and laser on/off times of the optical transceivers in the ONUs. As an example, a given cycle may be 1 ms, with 0.1 ms of overhead, which leaves 0.9 ms left for receiving data from the ONUs connected to the PON port 202. This 0.9 ms is shared between the ONUs in a manner that is fair.

The time remaining in a cycle after the overhead is subtracted off is typically referred to as the "available bandwidth" for the cycle. Although "bandwidth" refers to the rate of data transfer over a given period of time, not a time per se, the terms "bandwidth" and "transmission time" are effectively interchangeable in this context since the channel capacity of the PON port 202 is fixed. For example, the upstream bandwidth allocated to an ONU over the course of one second can be translated to the total length of the transmission windows granted to the ONU during that one second simply by dividing the upstream bandwidth by the channel capacity.

For a given cycle, the DBA algorithm computes the "total bandwidth request" of the cycle. In one embodiment, the total bandwidth request is equal to the sum of the current bandwidth requests for each of the ONUs connected to the PON port 202. The current bandwidth request for a given ONU is the minimum of (1) the bandwidth request in the REPORT message sent from the ONU, and (2) the Peak Information Rate (PIR) granted to that ONU by the service provider.

The total bandwidth request for a given cycle is then compared to a parameter referred to as the "total upstream bandwidth capacity" (or in an alternative embodiment, another parameter that is a function of the total upstream bandwidth capacity). If the total bandwidth request is less than the total upstream bandwidth capacity (or the parameter that is a function of the total upstream bandwidth capacity), then transmission windows are granted to each of the ONUs that are long enough to allow each of the ONUs to transmit the data they have requested or they are allowed based on their PIR. If, on the other hand, the total bandwidth request is greater than the total upstream bandwidth capacity (or the parameter that is a function of the total upstream bandwidth capacity), this indicates that there is more data to be transmitted from the ONUs than permitted by the DBA algorithm. In other words, the total amount of data transmitted from the ONUs through the PON port 202 in each cycle is capped by the total upstream bandwidth capacity parameter. If the total bandwidth request is greater than the total upstream bandwidth capacity (or the parameter that is a function of the total upstream bandwidth capacity) for a given cycle, then the DBA engine employs a fairness algorithm to ensure each of the ONUs is allocated a fair transmission window based on how much data they requested and/or the priority of their data. In this way, the DBA algorithm enforces a maximum upstream bandwidth at the PON port 202.

The total upstream bandwidth capacity is typically commensurate with the channel capacity of the PON port 202, and thus the maximum upstream bandwidth enforced at the PON port 202 is also typically commensurate with the channel capacity of the PON port 202 (it will not be the exactly the same, of course, due to overhead). However, if congestion is detected in step 302 of FIG. 6, then this total upstream bandwidth capacity parameter can be reduced in order to enforce a lower maximum upstream bandwidth. This lower total upstream bandwidth capacity will be enforced regardless of the total bandwidth request for each cycle.

For example, assume the default upstream bandwidth capacity parameter is 0.9 ms per cycle of the DBA algorithm. If the total bandwidth request from all of the ONUs connected to PON port 202 is 0.8 ms in a given cycle, then transmission windows are granted to each of the ONUs that are long enough to allow each of the ONUs to transmit the data they have requested or they are allowed based on their PIR. However, if the total bandwidth request is 0.95 ms in the given cycle, then all of the data from each of the ONUs cannot be transmitted, but instead only the equivalent of 0.9 ms can be transmitted, as capped by the total upstream bandwidth capacity parameter. Therefore, in this situation, a fairness algorithm must be employed by the DBA engine 218 to ensure that each of the ONUs are allotted a transmission window comparable to their needs. An example of a simple fairness algorithm is to split the total upstream bandwidth capacity (0.9 ms) evenly between the requesting ONUs; i.e. grant each of the requesting ONUs a transmission window having a length equal to the upstream bandwidth capacity divided by the number of requesting ONUs. Another example of a fairness algorithm is to split the total upstream bandwidth capacity (0.9 ms) amongst the requesting ONUs proportional to the amount of data each ONU is requesting to transmit. Yet another example of a fairness algorithm is to split the total upstream bandwidth capacity (0.9 ms) amongst the requesting ONUs proportional to the PIR or CIR of each ONU requesting to transmit data.

When congestion of data in NNI buffer 242 is detected (step 302), assume that in response the DBA engine 218 reduces the total upstream bandwidth capacity from 0.9 ms to 0.7 ms. Therefore, any total bandwidth request greater than 0.7 ms will result in a fairness algorithm to ensure that only 0.7 ms of bandwidth is split between the ONUs.

An example of a DBA algorithm that works on cycles and employs a total bandwidth request, a total upstream bandwidth capacity, and a fairness algorithm if the total bandwidth request exceeds the total upstream bandwidth capacity, is described in detail in U.S. patent application Ser. No. 12/753,705, filed on Apr. 2, 2010, and entitled "NETWORK TRANSPORT SYSTEM WITH HYBRID DYNAMIC BANDWIDTH ALLOCATION MECHANISM AND METHOD OF OPERATION THEREOF". This patent application is incorporated herein by reference. However, for the sake of completeness, the relevant teachings of this patent application are also included at the end of this description immediately before the claims. In this DBA algorithm, the reference character 6340 designates the total bandwidth request, and the reference character 6220 designates the total upstream bandwidth capacity. If this specific DBA algorithm is implemented in DBA engine 218, then when congestion of data in NNI buffer 242 is detected (step 302), the DBA engine 218 can enforce a lower maximum upstream bandwidth at PON port 202 by reducing the total upstream bandwidth capacity parameter 6220.

The use of a total upstream bandwidth capacity has a benefit in that it allows the DBA engine 218 to reduce the maximum upstream bandwidth enforced at PON port 202 without targeting one specific ONU and without modifying the core operation of the DBA algorithm. The total upstream bandwidth capacity parameter is simply an input to the DBA algorithm, which is used to limit the maximum amount of upstream bandwidth allocated across all of the ONUs connected to PON port 202. As is clear from the explanation above, the core operation of the DBA algorithm works the same regardless of the specific value of the total upstream bandwidth capacity parameter.

Figure 7:
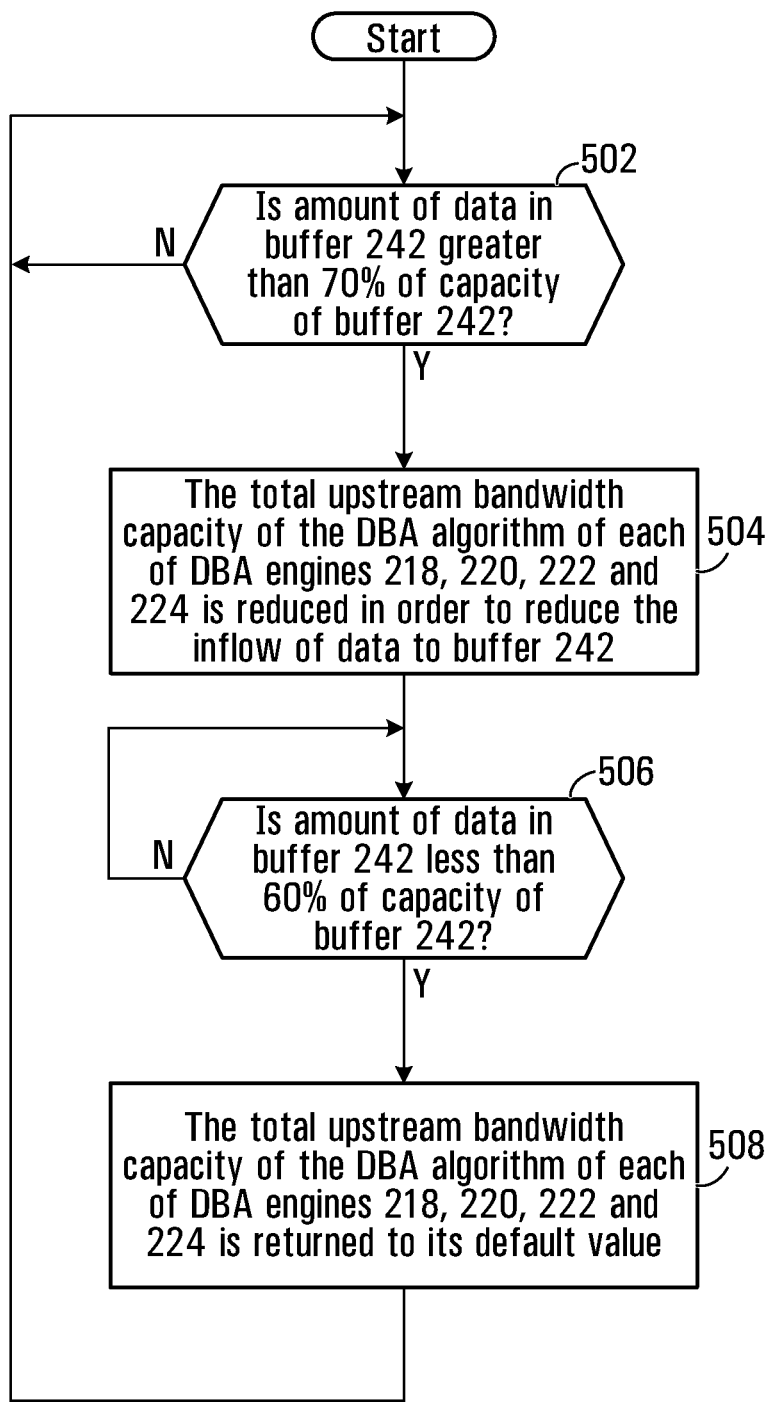
FIG. 7 is a flow chart of yet another method of congestion control.

FIG. 7 illustrates an embodiment of a method of congestion control by controlling the total upstream bandwidth capacity parameter of the DBA algorithm at each of DBA engines 218, 220, 222, and 224.

In step 502, it is determined whether there is congestion of data to be transmitted through the NNI uplink port 248. As explained above, detection of congestion can be determined multiple ways, but for the sake of example, in this embodiment, congestion is indicated if the amount of data in the NNI buffer 242 is greater than 70% of the total capacity of the buffer 242. Thus, step 502 comprises obtaining a measurement of the amount of data in buffer 242 and determining whether the amount of data in the buffer 242 is greater than 70% of the total capacity of the buffer 242. If not, step 502 is repeated on a periodic basis, for example, once every cycle of the DBA algorithm. If so, the method proceeds to step 504. In step 504, the total upstream bandwidth capacity of the DBA algorithm of each of DBA engines 218, 220, 222, and 224 is reduced in order to reduce the inflow of data to buffer 242. In step 506, the amount of data in the NNI buffer 242 is monitored. Once the amount of data in the NNI buffer 242 is below 60% of the total capacity of the buffer 242, which in this example embodiment means that congestion is no longer detected, the method proceeds to step 508. In step 508, the total upstream bandwidth capacity of the DBA algorithm of each of DBA engines 218, 220, 222, and 224 is returned to its default value, and the method returns to step 502.

It will be appreciated that the values 70% and 60% are chosen as a specific example. Moreover, in some embodiments, these values may be configurable on an implementation specific basis.

The specific method for determining the amount of reduction of the total upstream bandwidth capacity of the DBA algorithm of each of DBA engines 218, 220, 222, and 224 can be performed multiple ways. A few specific examples are explained below:

(1) In some embodiments, the maximum upstream bandwidth of the uplink port (e.g. the NNI port 248) is evenly divided into sub-bandwidths, each sub-bandwidth corresponding to a respective one of the PON ports. The total upstream bandwidth capacity of the DBA algorithm of each of the DBA engines 218, 220, 222, and 224 is then adjusted (typically reduced) to equal the corresponding sub-bandwidth. For example, assuming the OLT 200 shown in FIG. 4, if the maximum upstream bandwidth of the NNI port 248 is 10 Gigabits per second (Gbps), then the total upstream bandwidth capacity of the DBA algorithm of each of DBA engines 218, 220, 222, and 224 is adjusted to 2.5 Gbps (10 Gbps divided by 4 ports) for each of PON ports 202, 204, 206, and 208. Alternatively, in other embodiments, the total upstream bandwidth capacity of the DBA algorithm of each of the DBA engines 218, 220, 222, and 224 is reduced by the same fixed (predetermined) value, but not necessarily resulting in the sum of the total upstream bandwidth capacities enforced at each of the PON ports 202, 204, 206, and 208 being equal to the maximum upstream bandwidth of the uplink NNI port 248. For example, the total upstream bandwidth capacity of the DBA algorithm of each of the DBA engines 218, 220, 222, and 224 may be reduced by 1 Gbps.

(2) In some embodiments, the maximum upstream bandwidth of the uplink port (e.g. the NNI port 248) is divided into a plurality of sub-bandwidths, each sub-bandwidth corresponding to a respective one of the PON ports. The value of each sub-bandwidth is proportional to the number of active ONUs connected to the PON port associated with that sub-bandwidth. The total upstream bandwidth capacity of the DBA algorithm of each of DBA engines 218, 220, 222, and 224 is then adjusted (typically reduced) to equal the corresponding sub-bandwidth. For example, assuming the OLT 200 shown in FIG. 4, if the maximum upstream bandwidth of the NNI port 248 is 10 Gbps, and PON port 202 has 256 active ONUs connected thereto, and each one of PON ports 204, 206, and 208, has 128 active ONUs connected thereto, then the total upstream bandwidth capacity of the DBA algorithm of each of DBA engines 218, 220, 222, and 224 is adjusted such PON port 202 enforces a maximum upstream bandwidth of 4 Gbps, and each of PON ports 204, 206, and 208 enforce a maximum upstream bandwidth of 2 Gbps. That is, the DBA engine associated with each of PON ports 204, 206, and 208 reduces its total upstream bandwidth capacity more than the DBA engine associated with PON port 202 to enforce a maximum upstream bandwidth at each of PON ports 204, 206, and 208 that is half as much as the maximum upstream bandwidth enforced at PON port 202. This is because there are twice as many active ONUs connected to PON port 202. As will be appreciated, in other embodiments, the maximum upstream bandwidth of the uplink port can instead be divided into sub-bandwidths proportionally in accordance with the number of registered ONUs (versus active ONUs) connected to each of the PON ports. Alternatively, in other embodiments, the total upstream bandwidth capacity of the DBA algorithm of each of the DBA engines 218, 220, 222, and 224 is reduced by a value proportional to the number of active or registered ONUs associated with that port. However, the reduction does not necessarily result in the sum of the total upstream bandwidth capacities enforced at each of the PON ports 202, 204, 206, and 208 being equal to the maximum upstream bandwidth of the uplink port. For example, the total upstream bandwidth capacity of the DBA algorithm of each of the DBA engines 220, 222, and 224 may be reduced by 2 Gbps, and the total upstream bandwidth capacity of the DBA algorithm of DBA engine 218 may be reduced by 1 Gbps (half as much as 2 Gbps), assuming there are twice as many active or registered ONUs connected to PON port 202 versus PON ports 204, 206, and 208.

(3) In some embodiments, the amount by which the total upstream bandwidth capacity of the DBA algorithm of each of the DBA engines is reduced is proportional to the sum of the amount of data requested (e.g. the total bandwidth request) from the ONUs connected to the port associated with each respective DBA engine. For example, assuming the OLT 200 of FIG. 4, if for a given cycle the total amount of bandwidth being requested from the ONUs connected to PON port 202 is twice as much as the total amount of bandwidth being requested from the ONUs connected to each of PON ports 204, 206, and 208, then DBA engine 218 will reduce the total upstream bandwidth capacity of its DBA algorithm by half as much as the reduction of the total upstream bandwidth capacity parameter of the respective DBA algorithm of each of DBA engines 220, 222, and 224.

(4) In some embodiments, the maximum upstream bandwidth of the uplink port (e.g. the NNI port 248) is divided into a plurality of sub-bandwidths, each sub-bandwidth corresponding to a respective one of the PON ports. The value of each sub-bandwidth is proportional to the sum of the amount of data requested from the ONUs connected to the PON port associated with that sub-bandwidth. The total upstream bandwidth capacity of the DBA algorithm of each of DBA engines 218, 220, 222, and 224 is then adjusted (typically reduced) to equal the corresponding sub-bandwidth.

(5) In some embodiments, the amount by which the total upstream bandwidth capacity of the DBA algorithm of each of the DBA engines is reduced is proportional to the upstream traffic rate measured at the associated PON port. For example, assuming the OLT 200 of FIG. 4, if the upstream traffic rate measured at PON port 202 is twice as much as the upstream traffic rate measured at each of PON ports 204, 206, and 208, then DBA engine 218 will reduce the total upstream bandwidth capacity of its DBA algorithm by half as much as the reduction of the total upstream bandwidth capacity parameter of the respective DBA algorithm of each of DBA engines 220, 222, and 224. One way of measuring the upstream traffic rate at a PON port is to use a byte counter in the MPCP engine to count the number of bytes received at the PON port in each DBA cycle.

(6) In some embodiments, the maximum upstream bandwidth of the uplink port (e.g. the NNI port 248) is divided into a plurality of sub-bandwidths, each sub-bandwidth corresponding to a respective one of the PON ports. The value of each sub-bandwidth is proportional to the upstream traffic rate measured at the corresponding PON port. The total upstream bandwidth capacity of the DBA algorithm of each of DBA engines 218, 220, 222, and 224 is then adjusted (typically reduced) to equal the corresponding sub-bandwidth.

(7) In some embodiments, the amount by which the total upstream bandwidth capacity of the DBA algorithm of each of the DBA engines is reduced is proportional to the sum of the Peak Information Rate (PIR) assigned to each ONU connected to the PON port associated with the DBA algorithm. For example, assuming the OLT 200 of FIG. 4, if the sum of the PIR of each of the ONUs connected to PON port 202 is twice as much as the sum of the PIR of each of the ONUs connected to each of PON ports 204, 206, and 208, then DBA engine 218 will reduce the total upstream bandwidth capacity of its DBA algorithm by half as much as the reduction of the total upstream bandwidth capacity parameter of the respective DBA algorithm of each of DBA engines 220, 222, and 224.

(8) In some embodiments, the maximum upstream bandwidth of the uplink port (e.g. the NNI port 248) is divided into a plurality of sub-bandwidths, each sub-bandwidth corresponding to a respective one of the PON ports. The value of each sub-bandwidth is proportional to the sum of the PIR assigned to each ONU connected to the corresponding PON port. The total upstream bandwidth capacity of the DBA algorithm of each of DBA engines 218, 220, 222, and 224 is then adjusted (typically reduced) to equal the corresponding sub-bandwidth.

(9) In some embodiments, the amount by which the total upstream bandwidth capacity of the DBA algorithm of each of the DBA engines is reduced is proportional to the sum of the Committed Information Rate (CIR) assigned to each ONU connected to the PON port associated with the DBA algorithm. For example, assuming the OLT 200 of FIG. 4, if the sum of the CIR of each of the of the ONUs connected to PON port 202 is twice as much as the sum of the CIR of each of the ONUs connected to each of PON ports 204, 206, and 208, then DBA engine 218 will reduce the total upstream bandwidth capacity of its DBA algorithm by half as much as the reduction of the total upstream bandwidth capacity parameter of the respective DBA algorithm of each of DBA engines 220, 222, and 224.

(10) In some embodiments, the maximum upstream bandwidth of the uplink port (e.g. the NNI port 248) is divided into a plurality of sub-bandwidths, each sub-bandwidth corresponding to a respective one of the PON ports. The value of each sub-bandwidth is proportional to the sum of the CIR assigned to each ONU connected to the corresponding PON port. The total upstream bandwidth capacity of the DBA algorithm of each of DBA engines 218, 220, 222, and 224 is then adjusted (typically reduced) to equal the corresponding sub-bandwidth.

It will be appreciated that a combination of some of (1) to (10) described above can also be used to determine the reduction of the total upstream bandwidth capacity of the DBA algorithm of each of the DBA engines. Therefore, any one of options (1) to (10), or some combination thereof, may be implemented. For example, in one embodiment, options (2), (4), (8), and (10), may be implemented.

Figure 8:
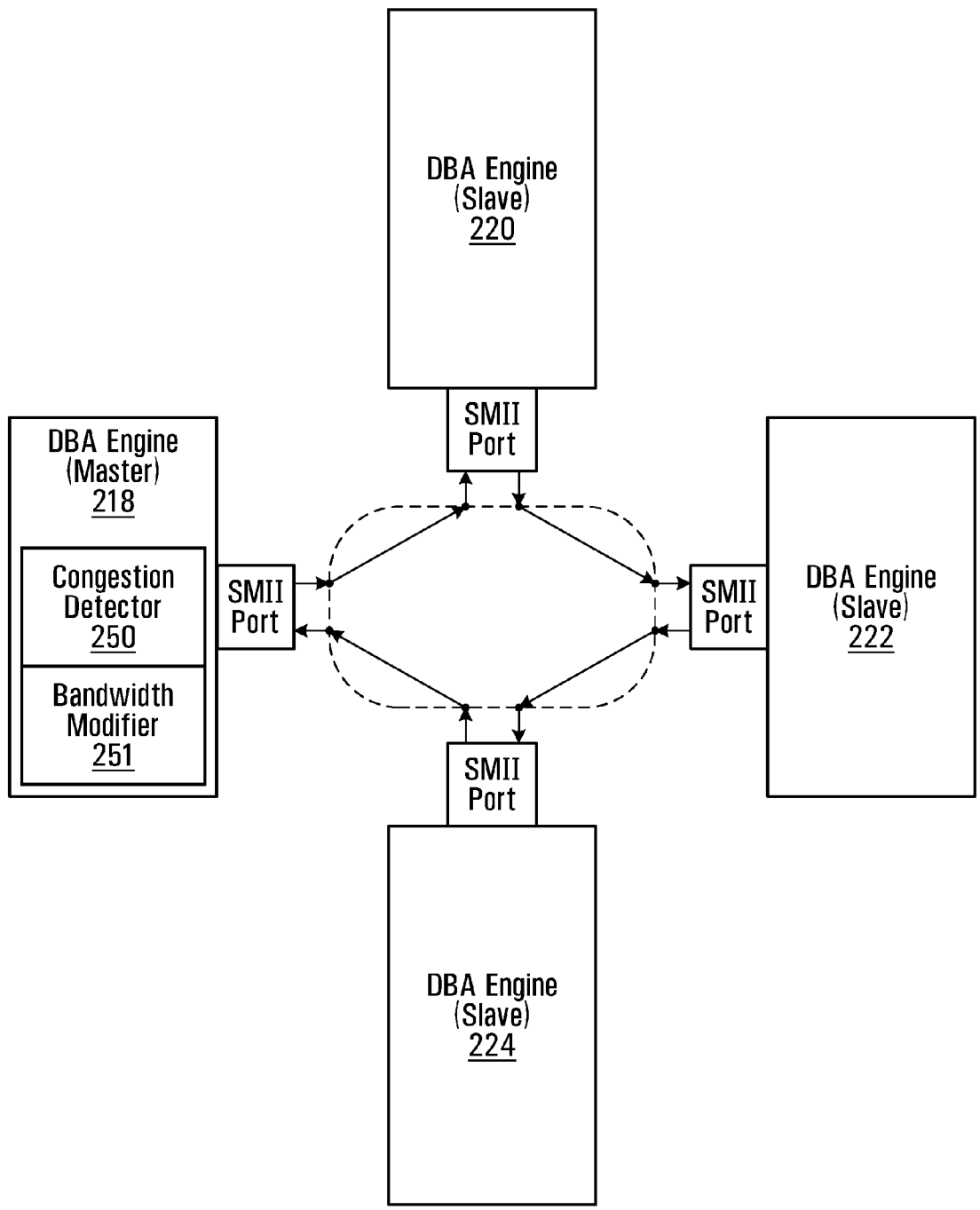
FIG. 8 is a block diagram illustrating dynamic bandwidth allocation (DBA) engines communicating using an SMII ring.

An example embodiment for configuring the communication between DBA engines 218, 220, 222, and 224 is shown in FIG. 8. In this example embodiment, congestion detector and its associated bandwidth modifier are shown as a component of the DBA engine 218. These components are designated using reference numeral 250 and 251 respectively. However, as explained earlier, these components can instead be located in other places in the OLT 200.

The congestion detector 250 in DBA engine 218 determines if there is congestion on a periodic basis, for example, once every cycle of the DBA algorithm. If congestion is detected, the bandwidth modifier 251 implements reduction of the maximum upstream bandwidth enforced by each of DBA engines 218, 220, 222, and 224. The amount of the reduction can be determined, for example, using one of methods (1) to (10) described above.

The DBA engine 218 acts as a master DBA engine. That is, DBA engine 218 receives from each of DBA engines 220, 222, and 224 information relating to each of PON ports 204, 206, 208, such as the number of active ONUs connected to each of PON ports 204, 206, 208, the amount of data requested from the ONUs connected to each of PON ports 204, 206, and 208, the upstream traffic rate measured at each of PON ports 204, 206, and 208, the sum of the Peak Information Rate (PIR) assigned to each ONU connected to each of PON ports 204, 206, and 208, and/or the sum of the Committed Information Rate (CIR) assigned to each ONU connected to each of PON ports 204, 206, and 208. In some embodiments, this information is received once every cycle of the DBA algorithms. If congestion is detected, the DBA engine 218 uses this information as necessary to implement one or more of methods (1) to (10) described above to determine by how much the maximum upstream bandwidth at each of PON ports 202, 204, 206, and 208 should be reduced for that cycle. The DBA engine 218 then instructs (via bandwidth modifier 251) each of DBA engines 220, 222, and 224 to reduce their enforced maximum upstream bandwidth by the amount determined by DBA engine 218 for the duration of that cycle. In this regard, DBA engine 218 acts as a master that instructs DBA engine slaves 220, 222, and 224. A benefit of such an arrangement is that it allows the logic and circuitry for implementing the congestion control to be consolidated in the master DBA engine 218, with the other slave DBA engines requiring only additional logic/control circuitry to transmit information to and receive information from the master DBA engine 218.

In the illustrated embodiment, DBA engines 218, 220, 222, and 224 communicate using a Serial Media Independent Interface (SMII) ring, as is known in the art.

Detailed Example of a DBA Algorithm for Use with Embodiments Described Herein:

The remainder of the description discusses in detail a DBA algorithm having a total upstream bandwidth capacity parameter that can be modified as described above in order to reduce the maximum bandwidth enforced by the DBA algorithm. The DBA algorithm explained below is described in U.S. patent application Ser. No. 12/753,705, filed on Apr. 2, 2010, and entitled "NETWORK TRANSPORT SYSTEM WITH HYBRID DYNAMIC BANDWIDTH ALLOCATION MECHANISM AND METHOD OF OPERATION THEREOF". This patent application is incorporated herein by reference. However, for the sake of completeness, the relevant teachings of this patent application are included below. As will be clear from the below, the total upstream bandwidth capacity parameter 6220 described below is that which is modified in the manner explained above in order to enforce a lower maximum upstream bandwidth. The "total bandwidth request" described earlier is designated as reference character 6340 in the DBA engine described below.

Figure 9:
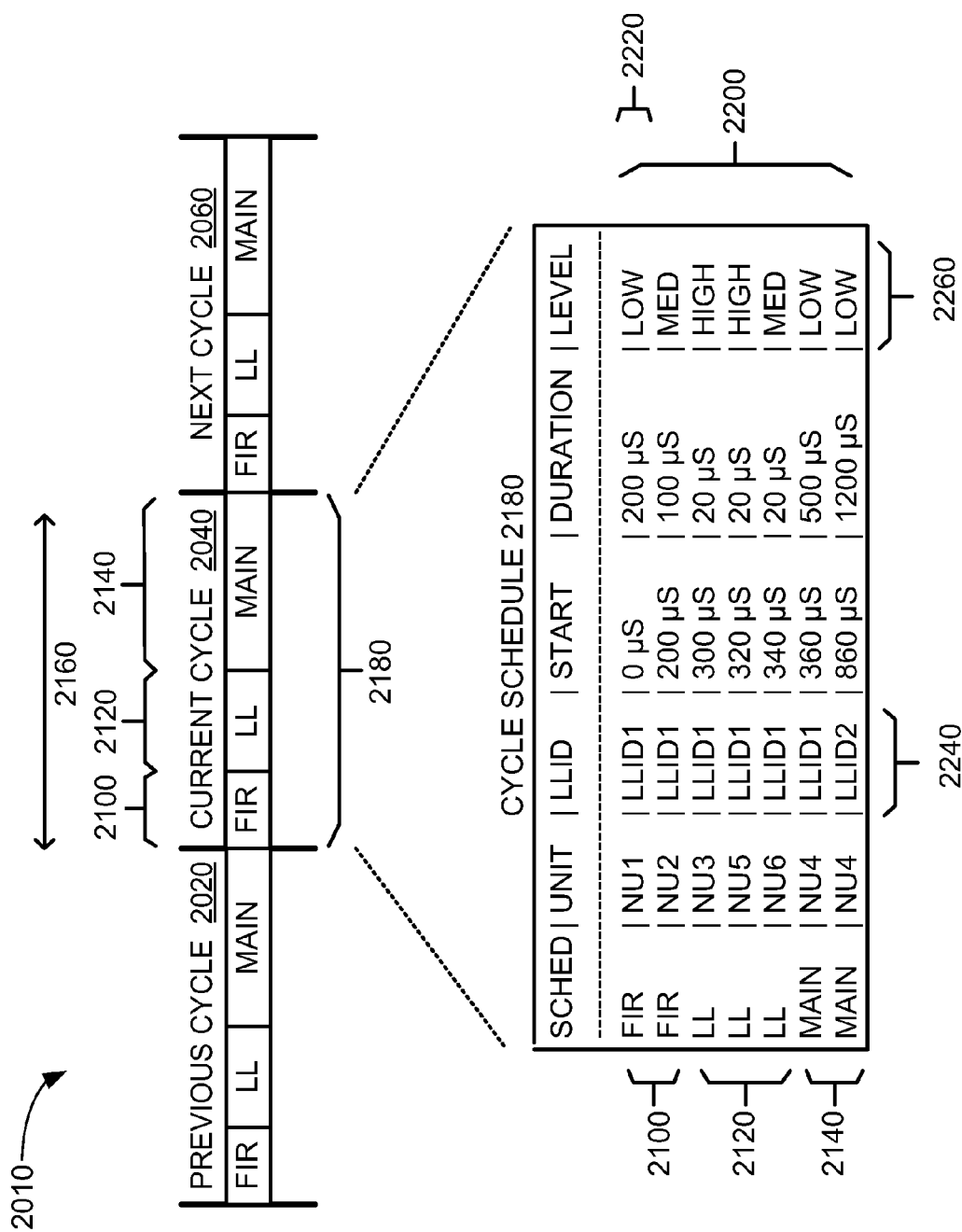
FIG. 9 is an example of a cycle-based scheme implemented by a DBA engine.

Referring now to FIG. 9, therein is shown an example of a cycle based scheme 2010 implemented by a DBA algorithm to enforce and arbitrate the upstream bandwidth from ONUs, or more generally, registered network units. The cycle based scheme 2010 defines the relationship and information flow between successive cycles used to allocate bandwidth. The cycle based scheme 2010 is used to schedule the upstream transmission without overlapping the transmission from different network units.

As an example, the cycle based scheme 2010 is shown with a previous cycle 2020, a current cycle 2040, and a next cycle 2060. A configured cycle time 2160 is the duration of the current cycle 2040. A cycle schedule 2180 is to schedule the upstream transmission without overlapping the transmission for the current cycle 2040 of the cycle based scheme 2010. Information from the previous cycle 2020 can be used to modify the allocation of bandwidth in the current cycle 2040. Information from the current cycle 2040 can be used to modify the next cycle 2060. The information flow between cycles is described in a later section.

For example, a first network unit can limit the transmission of the upstream traffic to the OLT by only transmitting data during time intervals assigned to the first network unit in the cycle schedule 2180. The first network unit can receive a bandwidth grant 2220 that can define when the first network unit can transmit information to the OLT. The bandwidth grant 2220 defines the start time, duration, and a grant level 2260 when the first network unit can transmit information upstream to the OLT for a logical link identifier 2240 The grant level 2260 defines a priority for the bandwidth grant 2220 for the logical link identifier 2240. For example, the grant level 2260 can indicate a high priority, a medium priority, or a low priority.

The cycle schedule 2180 can have a partition of the current cycle 2040 into a network grant list 2200 including the bandwidth grant 2220. The cycle schedule 2180 can be used to schedule the transmission of data from the first network unit to OLT without overlapping the transmission of data from a second network unit. The cycle schedule 2180 can include a main schedule grant 2140 and two auxiliary schedules including a fixed information rate schedule grant 2100 and a low latency schedule grant 2120.

The fixed information rate schedule grant 2100 defines the amount of time allocated within the current cycle 2040 for the transmission of fixed information rate data for all network units in the registered network unit list, including the first network unit, the second network unit, and up to an nth network unit. The fixed information rate schedule grant 2100 can include information that defines the start time and duration that the first network unit can send fixed information rate data upstream to the OLT. The fixed information rate schedule grant 2100 can include start time and duration for each network unit connected to the OLT.

Fixed information rate data is data that is transmitted at a rate that does not change, changes slowly, or changes predictably over time. Fixed information rate data can include status messages, high priority customer data, time division multiplexing (TDM) data, timing information, regular transmissions, or any combination thereof.

The low latency schedule grant 2120 defines the amount of time allocated in the current cycle 2040 for the transmission of low latency data from all network units in the registered network unit list. Low latency data is defined as data that requires transmission as soon as possible with the least amount of delay before transmission. Low latency data can include performances sensitive links such as video, audio, control system information, synchronization information, or any combination thereof.

The low latency schedule grant 2120 can include information that defines the start time and duration when the first network unit can send low latency information upstream to the OLT. The low latency schedule grant 2120 can include the start time and duration for each network unit connected to the OLT.

The cycle schedule 2180 can include the main schedule grant 2140. The main schedule grant 2140 defines the amount of time assigned to the transmission of data that is not defined as fixed information rate data or low latency data. The main schedule grant 2140 also defines the amount of time assigned to the second network unit within the current cycle 2040.

The main schedule grant 2140 can include information that defines the start time and duration when the first network unit can send information upstream to the OLT. The main schedule grant 2140 can include the start time and duration for each network unit connected to the OLT.

Referring now to FIG. 10, therein is an example of a main schedule processing timeline 3010. The main schedule processing timeline 3010 defines the timing of events that occur during the calculation of the cycle schedule 2180 of FIG. 9. The main schedule processing timeline 3010 depicts the processing that occurs across multiple cycles including the previous cycle 2020, the current cycle 2040, and the next cycle 2060.

As an example, the main schedule processing timeline 3010 can begin by receiving a traffic information report 3020 from the first network unit in the previous cycle 2020. The traffic information report 3020 provides the information about the current operating status of the network that is used to calculate the cycle schedule 2180. The traffic information report 3020 can provide information about the bandwidth demand for the first network unit 1060. The traffic information report 3020 can indicate the upstream traffic rate from a first subscriber unit connected to the first network unit. The traffic information report 3020 can include information about the level of congestion, packet sizes, network traffic levels, network statistics, or any combination thereof. The traffic information report 3020 can include information from other reports that are defined in later sections.

The DBA engine can calculate the main schedule grant 2140 using the traffic information report 3020 during the previous cycle 2020 and send the main schedule grant 2140 to the first network unit during the current cycle 2040. The first network unit can then transmit the upstream traffic data to the OLT.

The main schedule processing timeline 3010 can require two cycles to complete the process of receiving the traffic information report 3020, generating the main schedule grant 2140, and sending the main schedule grant 214 to the first network unit.

Referring now to FIG. 11, therein is shown an example of a low latency schedule processing timeline 4010. The low latency schedule processing timeline 4010 can describe the processing required to calculate the low latency schedule grant 2120 of FIG. 9 across multiple cycles including the current cycle 2040, the previous cycle 2020, and the next cycle 2060. The low latency schedule grant 2120 can include the grant information for low-latency network connections.

As an example, the low latency schedule processing timeline 4010 can begin by a receiving the traffic information report 3020 from the first network unit in the current cycle 2040. The low latency schedule grant 2120 can be calculated using the traffic information report 3020 during the current cycle 2040, and the low latency schedule grant 2120 can be sent to the first network unit during the current cycle 2040. The main schedule processing timeline 3010 can be performed in one cycle to complete the process of receiving the traffic information report 3020, generating the low latency schedule grant 2120, and sending the low latency schedule grant 2120 to the first network unit.

Figure 12:
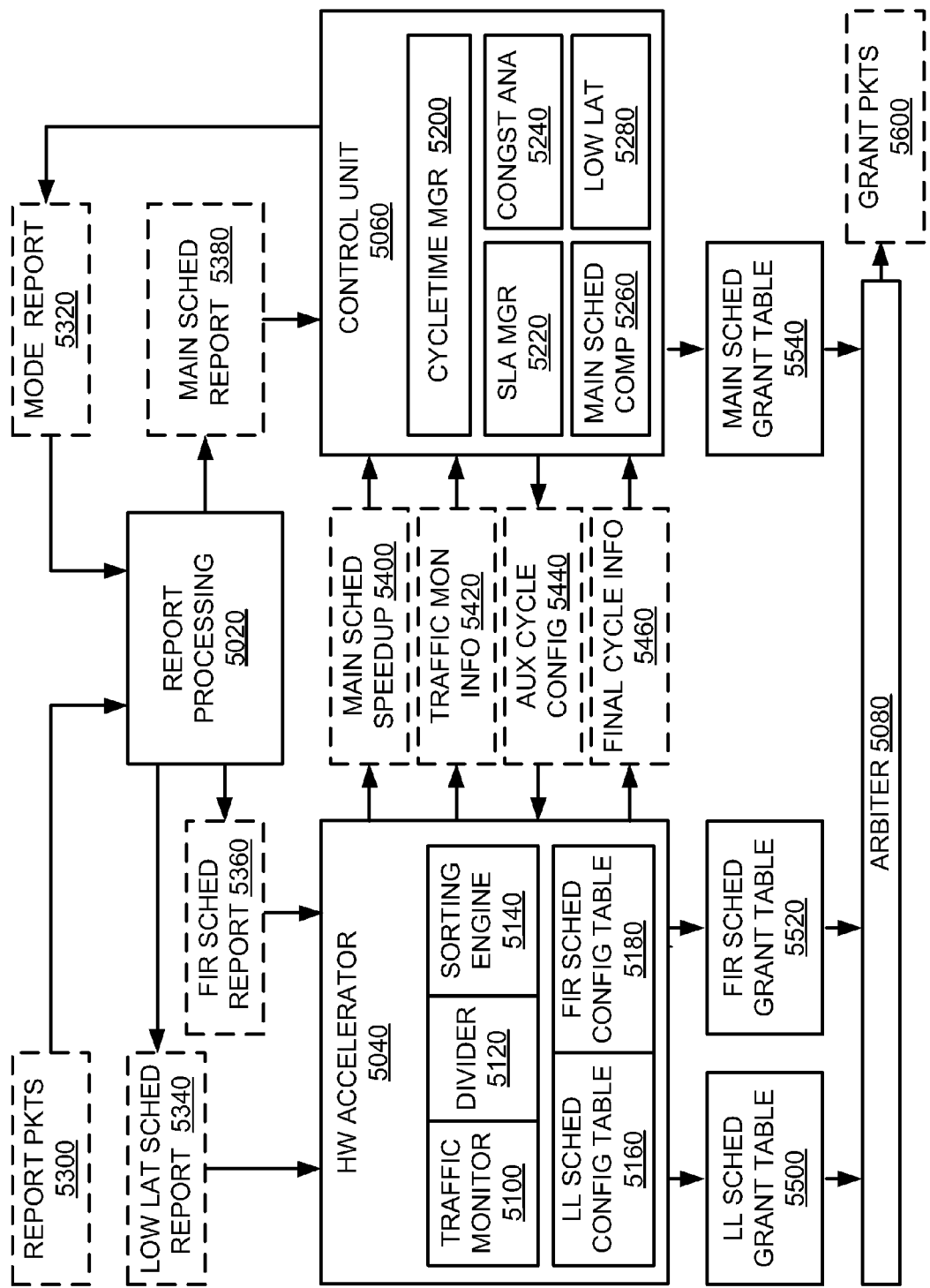
FIG. 12 is an example of a DBA engine.

Referring now to FIG. 12, therein is shown a block diagram of relevant portions of the DBA engine. The DBA engine can include a report processing module 5020, a hardware accelerator 5040, a control unit 5060, and an arbiter module 5080.

The DBA engine can calculate the cycle schedule 2180 of FIG. 9 using the report processing module 5020, the control unit 5060, the hardware accelerator 5040, and the arbiter module 5080. For example, the fixed information rate schedule grant table 5520 can be calculated by the hardware accelerator 5040 using a service level agreement information 6330 and a configured cycle time 2160. The service level agreement information 6330 is described in a later section.

In another example, the hardware accelerator 5040 can generate a low latency schedule grant table 5500 and a fixed information rate schedule grant table 5520 using: a low latency schedule report 5340, a fixed information rate schedule report 5360 from the report processing module 502, the service level agreement information 6330, the cycle length information, and an auxiliary cycle configuration report 5440 from the control unit 5060.

The control unit 5060 can generate a main schedule grant table 5540 using information from the report processing module 5020 and the hardware accelerator 5040 including a main schedule report 5380, a main schedule speedup report 5400, a traffic monitoring information 5420, and a final cycle information 5460. The main schedule speedup report 5400 can provide information about the reduction in the amount of time needed to calculate the fixed information rate schedule grant table 5520 and the low latency schedule grant table 5500. The traffic monitoring information 5420 can provide information about the level of network traffic as processed by the traffic monitor 5100. The final cycle information 5460 can include detailed information about the low latency schedule grant 2120 and the fixed information rate schedule grant 2100.

The control unit 5060 is a compute engine for general purpose computation, for specific application computation, or a combination thereof. For example, the control unit 5060 can be a microprocessor, a microcontroller, a computer, a cloud computer, a distributed computing element, or any combination thereof. The control unit 5060 can include software modules such as a cycletime manager module 5200, a service level agreement manager module 5220, a congestion analysis module 5240, a low latency module 5280, and a main schedule computation module 5260.

The control unit 5060 can execute software modules to implement the functionality of the DBA engine. The ability of the control unit 5060 to execute software modules provides an additional level of flexibility and programmability to the DBA engine that allows the addition or change of functionality over time.

The control unit 5060 can implement an iterative, cycle-based method to dynamically allocate bandwidth for the upstream data channel between the first network unit and the OLT. The control unit 5060 can calculate the cycle schedule 2180 and the main schedule grant 2140.

The control unit 5060 can coordinate the fixed information rate schedule grant 2100 and the low latency schedule grant 2120 on the hardware accelerator 5040. The control unit 5060 can be responsible for core system management and the allocation of work between the hardware accelerator 504 and the control unit 506.

The report processing module 5020 processes network information messages from the first network unit and distributes reports about the network status to the control unit 5060 and the hardware accelerator 5040. The report processing module 5020 can receive report packets from network units.

The report packet 5300 is a message from the first network unit that provides network traffic information about the request for bandwidth for each of the logical link identifier 2240 of the first network unit. The report packet 5300 can include requested grant size, priority, congestion information, status information, or any combination thereof.

The report processing module 5020 can be implemented in different ways and can include different implementations depending on which functional unit or external units are being interfaced with the report processing module 5020. The report processing module 5020 can be implemented in hardware, software, or a combination thereof. For example, the report processing module 5020 can be implemented by executing software on the control unit 5060, by dedicated hardware coupled to the hardware accelerator 5040, or by a combination of hardware and software portioned between the hardware accelerator 5040 and the control unit 5060.

The report processing module 5020 can be coupled with the control unit 5060 and the hardware accelerator 5040. The report processing module 5020 can process the report packet 5300 and a mode report 5320 to generate and send the low latency schedule report 5340 and the fixed information rate schedule report 5360 to the hardware accelerator 5040.

The report processing module 5020 can receive the mode report 5320 from the control unit 5060. The mode report 5320 can represent information including command information, operational parameters, status information, or any combination thereof. The mode report 5320 can be represented in a variety of ways including a single parameter, an array of parameters, or any combination thereof.

The report processing module 5020 can send information to the control unit in a variety of ways. For example, the report processing module 5020 can generate the main schedule report 5380 and send it to the control unit 5060. The main schedule report 5380 can provide the control unit 5060 with network information generated by processing the report packet 5300. The main schedule report 5380 can include the list of active LLIDs for the first network unit, the traffic information report 3020, mode information, or any combination thereof.

The report processing module 5020 can send information to the hardware accelerator 5040 in a variety of ways. For example, the report processing module 5020 can send the low latency schedule report 5340 and the fixed information rate schedule report 5360 to the hardware accelerator 5040. The low latency schedule report 5340 can include information to identify low latency LLIDs. The fixed information rate schedule report 5360 can include information about fixed information rate LLIDs.

The cycletime manager module 5200 calculates the cycle schedule 2180. For example, the cycletime manager module 5200 can be implemented as a software module that executes on the control unit 5060. The cycletime manager module 5200 can calculate the cycle schedule 2180 that can include the fixed information rate schedule grant 2100, the low latency schedule grant 2120, and the main schedule grant 2140. For example, the cycletime manager module 5200 can determine the configured cycle time 2160. The cycletime manager module 5200 can interface with the service level agreement manager module 5220, the congestion analysis module 5240, the low latency module 5280, and the main schedule computation module 5260 to determine the cycle schedule 2180.

The congestion analysis module 5240 determines the level of network congestion. For example, the congestion analysis module 5240 can be implemented as a software module that executes on the control unit 5060. The congestion analysis module 5240 can process the main schedule report 5380 and calculate the level of network congestion.

The service level agreement manager module 5220 can provide information about the service level agreement of the first network unit and the information is incorporated in the mode report 5320. For example, the service level agreement manager module 5220 can be implemented as a software module that executes on the control unit 5060 and distributes the service level agreement information 6330 to the main schedule computation module 5260. The first network unit can have the service level agreement information 6330 that defines the minimum and maximum levels of service the first network unit.

The service level agreement manager module 5220 can extract the service level agreement information 6330 in a variety of ways. For example, the service level agreement information 6330 can be manually entered in the network line terminal for the first network unit. In another example, the service level agreement information 6330 can be sent from the first network unit to the OLT. In yet another example, the service level agreement information 6330 can be changed dynamically by the first network unit and sent to the OLT. The service level agreement information 6330 can include the peak information rate (PIR) 6420, a committed information rate (CIR), a maximum burst size, a maximum delay, a minimum amount of bandwidth, a maximum amount of bandwidth, a maximum amount of latency, a maximum jitter, a packet size, or any combination thereof.

The low latency module 5280 generates the list of low latency logical list identifiers. For example, the low latency module 5280 can be implemented as a software module that executes on the control unit 5060. The low latency module 5280 can receive the main schedule report 5380 from the report processing module 5020 and generate a list of logical link identifiers that have a status that indicates a low latency performance requirement. Low latency performance requirements can include performances sensitive links such as video, audio, control system information, synchronization information, or any combination thereof.

The control unit 5060 can calculate the mode report 5320. The mode report 5320 can describe the status of the control unit 5060. The mode report 5320 can include information about the level of congestion, the service level agreement information 6330, and the list of low latency logical link identifiers.

The main schedule computation module 5260 calculates the main schedule grant 2140. The main schedule computation module 5260 can receive the main schedule report 5380 from the report processing module 5020 and the main schedule speedup report 5400 and the traffic monitoring information 5420 from the hardware accelerator 5040 to calculate the main schedule grant 2140. The main schedule grant 2140 can be calculated using the traffic monitoring information 5420, the main schedule speedup report 5400, the main schedule report 5380, the final cycle information 5460, the service level information, the list of low latency LLIDs, and the level of congestion. The main schedule computation module 5260 can send the main schedule grant table 5540 to the arbiter module 5080 for generating a grant packet 5600. The calculation of the main schedule grant 2140 is detailed in a later section.

The hardware accelerator 5040 can include hardware modules to perform dedicated operations including sorting with a sorting engine 5140, division with a divider 5120, and monitoring network traffic with a traffic monitor 5100. The hardware accelerator 5040 can also include a low latency schedule configuration table 5160 and a fixed information rate schedule configuration table 5180 to store schedule information.

The hardware accelerator 5040 can be implemented in a number of different ways. For example, the hardware accelerator 5040 can be a dedicated logic circuit, a hardware finite state machine, a parallel processor, a digital signal processor, an integrated circuit, discrete logic, a math co-processor, a pipelined processor, or any combination thereof. The hardware accelerator can be implemented in different configurations including a single hardware unit, separate discrete hardware units, multiple distributed hardware units, an external circuit, or any combination thereof.

The hardware accelerator 5040 can calculate the fixed information rate schedule grant 2100 using the fixed information rate schedule report 5360, traffic monitoring information, and the auxiliary cycle configuration report 5440. The fixed information rate schedule grant 2100 can include information about fixed information rate network grants.

The hardware accelerator 5040 can calculate the low latency schedule grant 2120 using the low latency schedule report 5340, traffic monitoring information, and the auxiliary cycle configuration report 5440. The low latency schedule grant 2120 can define the bandwidth grant 2220 for low latency network grants. The hardware accelerator 5040 can also generate the status and network information reports to be sent to the control unit 5060 including the main schedule speedup report 5400, the traffic monitoring information 5420, and the final cycle information 5460.

The traffic monitor 5100 is a hardware module coupled to the hardware accelerator 5040 that determines the network traffic statistics that can be used to generate the cycle schedule 2180. The traffic monitor 5100 can process network information in a variety of ways. For example, the traffic monitor 5100 can monitor traffic information directly to estimate traffic statistics. In another example, the traffic monitor 5100 can process reports and information from the report processing module 5020 including the low latency schedule report 5340 and the fixed information rate schedule report 5360 for calculating network traffic statistics. The traffic monitor 5100 can measure the minimum and maximum packet sizes, packet counts, upstream fragmentation loss, or any combination thereof.

The divider 5120 is a hardware module that can compute the divisor of two numbers. The divider 5120 can be implemented in different ways. For example, the divider 5120 can be implemented as a dedicated logical circuit, an arithmetic logic unit (ALU), a mathematical co-processor, or any combination thereof. The divider 5120 can perform division in hardware faster than division can be performed in software on the control unit 5060.

The sorting engine 5140 is a hardware module that can sort an array of numbers in ascending or descending order depending on the hardware configuration and control settings. The sorting engine 5140 can perform sorting in hardware faster than the same sorting can be performed in software on the control unit 5060. The sorting engine 5140 is used to reduce the amount of time required to sort information and to calculate the cycle schedule 2180. The sorting engine 5140 can be implemented in a variety of configurations. For example the sorting engine 5140 can be implemented by a dedicated logic circuit, a pipelined processor, an array processing unit, a mathematic co-processor, or any combination thereof.

The arbiter module 5080 functions to process the information about the cycle schedule 2180 and generate the grant packet 5600 that can be sent to the first network unit to implement the dynamic bandwidth allocation mechanism. For example, the grant packet 5600 can include the bandwidth grant 2220 for the first network unit.

The arbiter module 5080 can receive the low latency schedule grant table 5500, the fixed information rate schedule grant table 5520, from the hardware accelerator 5040. The arbiter module can also receive the main schedule grant table 5540 from the control unit 5060. The arbiter module 5080 can combine the information and generate the grant packet 5600 using the fixed information rate schedule grant table 5520, the low latency schedule grant table 5500, and the main schedule grant table 5540.

The arbiter module 5080 can be implemented in different ways and can include different implementations depending on which functional unit or external units are being interfaced with the arbiter module 5080. The arbiter module 5080 can be implemented in hardware, software, or a combination thereof. For example, the arbiter module 5080 can be implemented by executing software on the control unit 5060, by dedicated hardware coupled to the hardware accelerator 5040, or by a combination of hardware and software partitioned between the hardware accelerator 5040 and the control unit 5060.

Figure 13:
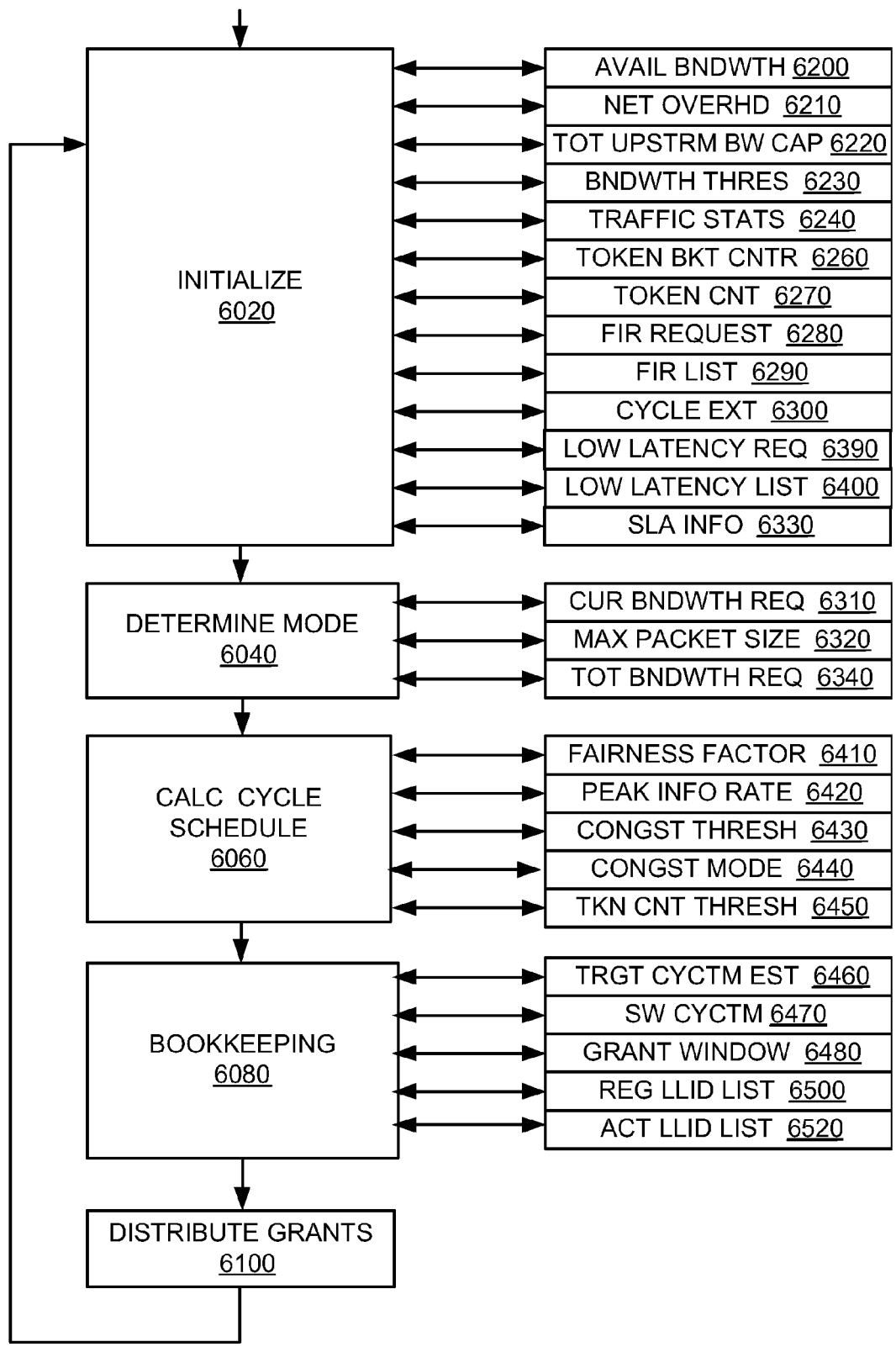
FIG. 13 is a flow chart of a DBA engine with a hybrid dynamic bandwidth allocation mechanism.

Referring now to FIG. 13, therein is shown a flow chart of hybrid dynamic bandwidth allocation implemented by the DBA engine (i.e. the DBA algorithm). The DBA engine can initialize the initialize module 6020, determine a congestion mode 6440, calculate the cycle schedule 2180 of FIG. 9 based on the congestion mode 6440, update the information for the next cycle, and distribute the schedule information. The congestion mode 6440 defines the level of network traffic congestion and is used to determine the method used to calculate the main schedule grant 2140.

The DBA engine can receive the report packet 5300 from the first network unit, calculate the cycle schedule 2180, and generate the grant packet 5600 for defining the transmission schedule for the first network unit.

In the DBA engine, as an example, each module is indicated by a number and successively higher module numbers follow one another. Control flow can pass from one module to the next higher numbered module unless explicitly otherwise indicated.

The DBA engine can be operated in several different ways. For example, the DBA engine can be operated as a single unit that can include both the hardware and software components of FIG. 12. In another example, the hardware and software components of the DBA engine can be implemented in separate units.

The DBA engine can receive network information and perform initial calculations in an initialize module 6020. The initialize module 6020 can receive the traffic information report 3020 of FIG. 10 and calculate an available bandwidth 6200. After the initialize module 6020 has successfully completed, the control flow can be transferred to a determine mode module 6040.

The initialize module 6020 can receive the traffic information report 3020 by receiving the report packet 5300 of FIG. 12, a registered logical link identifier list 6500, traffic monitoring statistics information, a token count 6270 or any combination thereof. The first network unit can have one or more network connections that are represented by the logical link identifier 2240 of FIG. 9 that can represent a logical link between the OLT and the first network unit. The first network unit can send the report packet 5300 containing network status information to the OLT. The token count 6270 defines the number of tokens allocated to the logical link identifier 2240 for the current cycle 2040 and represents the number of the grant request.

The initialize module 6020 can extract a fixed information rate request 6280, a low latency request 6390, and a cycle extension information 6300 from the report packet 5300. The fixed information rate request 6280 is the grant request for a fixed information rate network connection. The fixed information rate request 6280 can be used to calculate the fixed information rate schedule grant 2100. The low latency request 6390 can be used to calculate the low latency schedule grant 2120. The low latency request 6390 is the grant request 1500 that has a status that indicates that it is a low latency network connection. The initialize module 6020 can read a low latency list 6400 from the mode report 5320. The low latency list 6400 can be used to calculate the low latency schedule grant 2120. The low latency list 6400 is the list of the low latency request 6390, indicated by the logical link identifier 2240 having a status that the network connection is low latency.

The initialize module 6020 can calculate the available bandwidth 6200 that defines the amount of bandwidth that be allocated for transmission in a cycle. The available bandwidth 6200 can be calculated based on the information in the report packet 5300. For example, the available bandwidth 6200 can be calculated as the configured cycle time 2160 minus a network overhead 6210. The network overhead 6210 can include bandwidth associated with discovery and register-acknowledgement packets. The network overhead 6210 is the amount of bandwidth that is used for network operation and not specifically used to transmit subscriber information. The configured cycle time 2160 can include the amount of time allocated to the current cycle 2040.

The DBA engine can determine the level of network congestion in the determine mode module 6040. The determine mode module 6040 can determine the congestion mode 6440 for the current cycle 2040. After the determine mode module 6040 has successfully completed, the control flow can be transferred to a calculate cycle schedule module 6060.

The determine mode module 6040 can determine the congestion mode 6440 by comparing a total bandwidth request 6340 to a bandwidth threshold 6230. If the total bandwidth request 6340 meets or exceeds the bandwidth threshold 6230, then the congestion mode 6440 is set to "congestion". If the total bandwidth request 6340 is less than the bandwidth threshold 6230, then the congestion mode 6440 is set to "non-congestion". As explained below, the bandwidth threshold 6230 is based on the total upstream bandwidth capacity 6220.

The total bandwidth request 6340 is the total amount of bandwidth being requested by each of the logical link identifier 2240 listed in the registered logical link identifier list 6500. The total bandwidth request 6340 can be calculated by summing a current bandwidth request 6310 for each of the logical link identifier 2240 (or ONU) associated with the registered logical link identifier list 6500. The current bandwidth request 6310 is the amount of bandwidth being requested in the grant request.

The registered logical link identifier list 6500 can include the logical link identifier 2240 with the token count 6270 greater than a token count threshold 6450. The token count 6270 defines the number of tokens allocated to the logical link identifier 2240 for the current cycle 2040 and represents the number of the grant request.

The current bandwidth request 6310 for each of the logical link identifier 2240 can be calculated by summing the minimum of either a report request 7200 or a peak information rate (PIR) 6420 for the logical link identifier 2240 (or ONU) in the registered logical link identifier list 6500 plus the network overhead 6210. The report request 7200 is defined as the amount of bandwidth being requested by the logical link identifier 2240. For example, the report request 7200 can be equal to the grant request.

The bandwidth threshold 6230 is based on a total upstream bandwidth capacity 6220 and, in some embodiments, also on the level of network traffic that indicates the network is congested. The default value of the total upstream bandwidth capacity 6220 is based on the capacity of the port.

The DBA engine can calculate the cycle schedule 2180 in the calculate cycle schedule module 6060. The cycle schedule 2180 can include the fixed information rate schedule grant 2100, the low latency schedule grant 2120, and the main schedule grant 2140. After the calculate cycle schedule module 6060 has completed, the control flow can pass to a bookkeeping module 6080.

The calculate cycle schedule module 6060 can calculate the cycle schedule 2180 using an iterative, cycle-based method to allocate the available bandwidth 6200 to an active logical link identifier list 6520. The iterative cycle based method calculates the cycle schedule 2180 for the current cycle 2040 using information from the previous cycle 2020. Each iteration represents a single cycle and the process repeats every cycle. For example, the calculate cycle schedule module 6060 can check the congestion mode 6440, calculate the cycle schedule 2180 based on the congestion mode 6440 and a fairness factor 6410, and generate the grant packet 5600.

The cycle schedule 2180 can be calculated by partitioning the current cycle 2040 into three schedules and allocating bandwidth to each schedule. The fixed information rate schedule grant 2100 can allocate bandwidth for the grant request 1500 for fixed information rate connections. The low latency schedule grant 2120 allocates bandwidth for a grant request for low latency connections. The main schedule grant 2140 allocates bandwidth for grant requests that are not low latency or fixed information rate connections.

The fixed information rate schedule grant 2100 and the low latency schedule grant 2120 are calculated by the hardware accelerator 5040 and bandwidth can be allocated based on the grant request received in the report packet 5300. The fixed information rate schedule grant 2100 and the low latency schedule grant 2120 are described in more detail in a later section.

The main schedule grant 2140 is calculated by allocating bandwidth to the grant request for those connections that are not fixed information rate or low latency connection requests. The main schedule grant 2140 is calculated based on the congestion mode 6440 and the grant request received in the report packet 5300. If the congestion mode 6440 indicates "non-congestion", then the main schedule grant 2140 can be calculated using a pre-allocation method. If the congestion mode 6440 indicates "congestion", then the main schedule grant 2140 can be calculated using a weighted maximum-minimum fairness method. The calculation of the main schedule grant 2140 is described in more detail in a later section.

The DBA engine can update and configure system control parameters in the bookkeeping module 6080. The bookkeeping module 6080 can estimate the target cycletime, update the service level agreement and local databases, and identify the low-latency LLID and fixed information rate LLID list. The bookkeeping module 6080 can also perform the fixed information rate schedule and the low latency schedule configuration, and calculate the software cycle time used to calculate the main schedule grant 2140. When the bookkeeping module 6080 has completed, the control flow can pass to a distribute grants module 6100.

The bookkeeping module 6080 can calculate a target cycletime estimate 6460 by examining the report packet 5300 and the mode report 5320 and adding up the estimated duration of the fixed information rate schedule grant 2100, the low latency schedule grant 2120, and the main schedule grant 2140. The target cycletime estimate 6460 is defined as the estimated amount of time required for the cycle schedule 2180. The actual duration of the cycle schedule 2180 may vary depending on the actual network traffic information in the report packet 5300 for the current cycle 2040. The target cycletime estimate 6460 can be used in preliminary calculations until the actual duration can be calculated. For example, if the fixed information rate schedule grant 2100 has a duration of 10 µs, the low latency schedule grant 2120 has a duration of 21 µs, and the main schedule grant 2140 has a duration of 61 µs, then the target cycletime estimate 6460 can be calculated by adding up the durations to get a value of 82 µs.

The bookkeeping module 6080 can update the service level agreement database by extracting service level agreement information 6330 for the logical link identifier 2240 from the service level agreement manager module 5220 and storing the service level agreement information 6330 in the service level agreement database. The service level agreement database can be implemented as a memory unit such as a database, a disk file, an array, a random access memory, or any combination thereof.

The bookkeeping module 6080 can update the local database with information extracted from the report packet 5300. The local database is a memory that can be used to temporarily store information used to calculate the cycle schedule 2180. The local database can include network traffic information, the congestion mode 6440, the grant request, the peak information rate 6420, temporary values, grant information, request information, status information, logical link lists, or any combination thereof.

The bookkeeping module 6080 can identify the low latency list 6400 by examining the report packet 5300, identifying the logical link identifier 2240 that has the low latency request 6390, and adding the logical link identifier 2240 to the low latency list 6400. The bookkeeping module 6080 can identify a fixed information rate list 6290 by examining the service level agreement information 6330 and the configured cycle time 2160, identifying if the logical link identifier 2240 has the fixed information rate request 6280, and adding the logical link identifier 2240 to the fixed information rate list 6290.

The bookkeeping module 6080 can perform the fixed information rate configuration by calculating the fixed information rate schedule grant 2100 in a variety of methods. For example, the fixed information rate schedule grant 2100 can be calculated by creating the bandwidth grant 2220 for each of the logical link identifier 2240 in the fixed information rate list 6290. The bandwidth grant 2220 can include the start time, the duration, and the grant level that can be used to transmit information for the logical link identifier 2240.

The bookkeeping module 6080 can perform the low latency schedule configuration by calculating the low latency schedule grant 2120. The low latency schedule grant 2120 can be calculated in a variety of methods. For example, the low latency schedule grant 2120 can be calculated by creating the bandwidth grant 2220 for each of the logical link identifier 2240 in the low latency list 6400. The bandwidth grant 2220 can include the start time, the duration, and the grant level that can be used to transmit information for the logical link identifier 2240.

The bookkeeping module 6080 can calculate a software cycletime 6470 by determining if the total amount of time required by the cycle schedule 2180 is different from the amount of time estimated in the target cycletime estimate 6460. The software cycletime 6470 is defined as the actual amount of time required by the cycle schedule 2180. If the total time is less than the target cycletime estimate 6460, then the software cycletime 6470 can be increased to take advantage of the available time. If the total time is more than the target cycletime estimate 6460, then the software cycletime 6470 can be reduced to accommodate the larger time requirement for the fixed information rate schedule grant 2100 and the low latency schedule grant 2120.

The DBA engine provides dynamic bandwidth allocation with improved speed for calculating the low latency schedule grant 2120 and the fixed information rate schedule grant by performing the calculations using the hardware accelerator 5040. The low latency schedule grant 2120 and the fixed information rate schedule grant 2100 allocate bandwidth for the low latency and fixed information rate network connections. The bookkeeping module 6080 can increase the speed of calculating the low latency schedule grant 2120 and the fixed information rate schedule grant 2100 by using dedicated hardware to perform the calculation. This allows for an improved dynamic bandwidth allocation in which the DBA engine can more quickly calculate the bandwidth grant 2220 for the grant request for the low latency and fixed information rate connection requests.

The DBA algorithm can be implemented using a combination of functional units of the DBA engine of FIG. 12. For example, the DBA algorithm can be implemented by running the software modules on the control unit 5060 of FIG. 12, while processing sorting data on the sorting engine 5140 of FIG. 12 of the hardware accelerator 5040 of FIG. 12.

The initialize module 6020 can be implemented with the report processing module 5020 of FIG. 12 and the control unit 5060. For example, the report processing module 5020 can receive the report packet 5300 and the mode report 5320 and generate the fixed information rate schedule report 5360, the low latency schedule report 5340, and the main schedule report 5380.

The determine mode module 6040 can be implemented in several ways. For example, the determine mode module 6040 can be implemented using the control unit 5060, the report processing module 5020, and the main schedule report 5380. The control unit 5060 can receive the main schedule report 5380 from the report processing module 5020 and determine the congestion level of the network.

In another example, the determine mode module 6040 can be implemented with the congestion analysis module 5240 and can process the report packet 5300 to calculate the congestion mode 6440. The congestion mode 6440 can indicate when the total bandwidth request 6340 is greater than a congestion threshold 6430. The congestion analysis module 5240 can communicate with the report processing module 5020 to receive the main schedule report 5380 to calculate the congestion mode 6440.

The calculate cycle schedule module 6060 can be implemented with the report processing module 5020, the hardware accelerator 5040, the control unit 5060 and the arbiter module 5080. For example, the calculate cycle schedule module 6060 can use the arbiter module 5080 to generate the grant packet 5600 to send the cycle schedule 2180 to the network units.

The calculate cycle schedule module 6060 can also be implemented with the software modules of the control unit 5060 including the cycletime manager module 5200 of FIG. 12, the service level agreement manager module 5220, the congestion analysis module 5240 of FIG. 12, the main schedule computation module 5260 and the low latency module 5280. For example, the calculate cycle schedule module 6060 can calculate the main schedule grant 2140 using the control unit 5060 and the cycletime manager module 5200.

The calculate cycle schedule module 6060 can further be implemented with the hardware modules of the hardware accelerator 5040 including the traffic monitor 5100, the divider 5120 of FIG. 12, the sorting engine 5140 of FIG. 12, the low latency schedule configuration table 5160 of FIG. 12, and the fixed information rate schedule configuration table 5180 of FIG. 12. For example, the calculate cycle schedule module 6060 can calculate the main schedule grant 2140 using the sorting engine 5140 and the divider 5120.

The bookkeeping module 6080 can be implemented with the control unit 5060, the cycletime manager module 5200, the service level agreement manager module 5220, the low latency module 5280, the hardware accelerator 5040, the low latency schedule configuration table 5160, the fixed information rate schedule configuration table 5180, the traffic monitor 5100, the divider 5120, the sorting engine 5140, the low latency schedule configuration table 5160 and the fixed information rate schedule configuration table 5180. For example, the fixed information rate schedule grant 2100 can be calculated using the parameters stored in the fixed information rate schedule configuration table 5180.

The distribute grants module 6100 can be implemented using the arbiter module 5080, the low latency schedule grant table 5500, the fixed information rate schedule grant table 5520, and the main schedule grant table 5540. For example, the grant packet 5600 can be generated using the fixed information rate schedule grant table 5520 to generate the fixed information rate schedule grant 2100. In another example, the arbiter module 5080 can process the information in the low latency schedule grant table 5500, the fixed information rate schedule grant table 5520, and the main schedule grant table 5540 and generate the grant packet 5600 by creating the grant packet 5600 and appending the bandwidth grant 2220 for the first network unit to the grant packet 5600.

Figure 14:
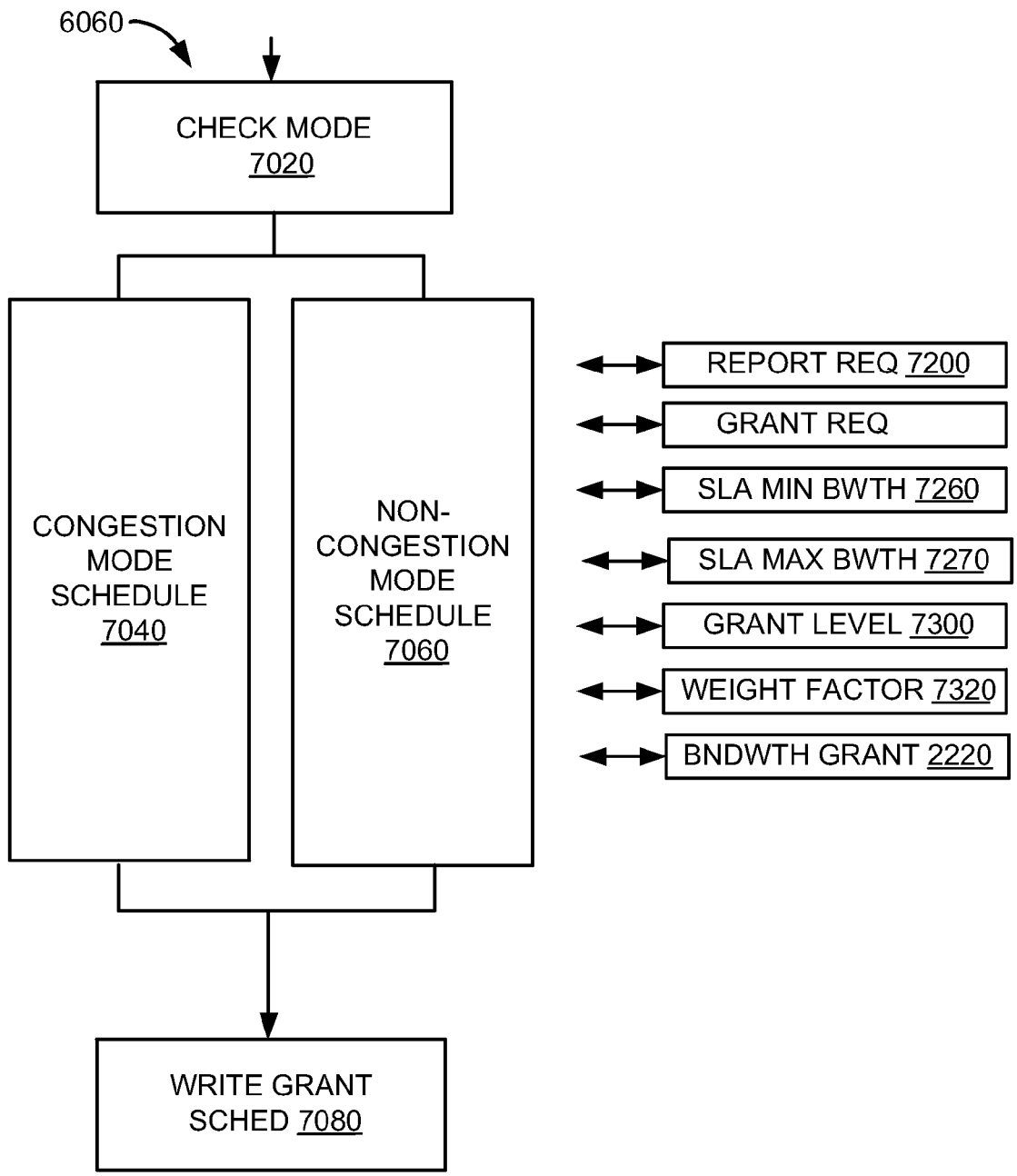
FIG. 14 is a flow chart of the calculate cycle schedule module of FIG. 13.

Referring now to FIG. 14, therein is shown detailed flow chart of the calculate cycle schedule module 6060 of FIG. 13. The calculate cycle schedule module 6060 can calculate the schedule grants for the cycle based on the congestion mode 6440. A full cycle can include three schedule grants including the fixed information rate schedule grant 2100, the low latency schedule grant 2120, and the main schedule grant 2140.

The calculate cycle schedule module 6060 can determine the method of calculating the cycle schedule 2180 based on the congestion mode 6440 in a check mode module 7020. The check mode module 7020 can read the congestion mode 6440 and if the congestion mode 6440 indicates "congestion", then the control flow can pass to a congestion mode schedule module 7040. If the congestion mode 6440 indicates "non-congestion", then the control flow can pass to a non-congestion mode schedule module 7060.

The congestion mode schedule module 7040 can calculate the main schedule grant 2140 when the congestion mode 6440 indicates "congestion." The main schedule grant 2140 defines the allocation of the available bandwidth 6200 to satisfy the report request 7200 of the active logical link identifier list 6520. When the congestion mode schedule module 7040 has completed, the control flow can pass to a write grant schedule module 7080.

The main schedule grant 2140 can include the bandwidth grant 2220 for each of the logical link identifier 2240 in the active logical link identifier list 6520 that can define when the logical link identifier 2240 can transmit information. The bandwidth grant 2220 for the logical link identifier 2240 can include a start time, a duration, the grant level 2260 or any combination thereof. The grant level 2260 defines a priority for the bandwidth grant 2220 for the logical link identifier 2240. For example, the grant level 2260 can indicate a high priority, a medium priority, or a low priority.

The active logical link identifier list 6520 can include an entry for the bandwidth grant 2220 for each of the logical link identifier 2240 that has the grant request. The bandwidth grant 2220 for each of the logical link identifier 2240 in the active logical link identifier list 6520 can receive a minimum grant equal to the minimum of the two values represented by the minimum bandwidth 7260 of the logical link identifier 2240 or the report request 7200 of the logical link identifier 2240. The minimum grant ensures that each of the logical link identifier 2240 in the active logical link identifier list 6520 can receive some bandwidth in each cycle. For example, the minimum bandwidth 7260 can include a committed information rate that defines the lowest information rate allowed.

The main schedule grant 2140 can be calculated in a variety of methods. For example, the main schedule grant 2140 can be calculated using a weighted maximum-minimum fairness method including using the fairness factor 6410.

Each of the logical link identifier 2240 in the active logical link identifier list 6520 can be assigned the fairness factor 6410 and the active logical link identifier list 6520 can be sorted according to the fairness factor 6410. The fairness factor 6410 is a value used to implement the weighted maximum-minimum fairness method by calculating an index value and sorting the data based on the value.

The weighted maximum-minimum fairness method is implemented by having the DBA engine fulfill the grant request in sorted order until the available bandwidth 6200 has been allocated. The grant request can be fulfilled by creating the bandwidth grant 2220 in the main schedule grant 2140 and allocating the requested bandwidth to the bandwidth grant 2220 in units of a maximum packet size 6320.

Any remaining bandwidth can be distributed among the active logical link identifier list 6520 using a round robin method by granting additional bandwidth in units of the maximum packet size 6320. The maximum packet size 6320 can be calculated in several ways. For example, the maximum packet size 6320 can be set to a pre-defined value. In another example, the maximum packet size 6320 can be calculated by the traffic monitor 5100 based on the maximum observed packet size.

The fairness factor 6410 is a value used to implement the weighted maximum-minimum fairness method by calculating an index value and sorting the data based on the value. The fairness factor 6410 can be calculated in a variety of ways. For example, the fairness factor 6410 for the logical link identifier 2240 can be calculated by dividing the report request 7200 by a weight factor 7320.

The fairness factor 6410 allows the available bandwidth 6200 to be sorted so it can be divided fairly between the list of LLIDs requesting bandwidth. The available bandwidth 6200 can be fairly allocated when the bandwidth is divided among the active logical link identifier list 6520 based on the current demand and the service level agreement for each of the logical link identifier 2240.

The non-congestion mode schedule module 7060 can calculate the main schedule grant 2140 when the congestion mode 6440 indicates "non-congestion." The main schedule grant 2140 defines the allocation of the available bandwidth 6200 to satisfy the report request 7200 of the active logical link identifier list 6520. When the non-congestion mode schedule module 7060 has completed, the control flow can pass to the write grant schedule module 7080.

The active logical link identifier list 6520 can include an entry for the bandwidth grant 2220 for each of the logical link identifier 2240 that have a grant request. The bandwidth grant 2220 for each of the logical link identifier 2240 in the active logical link identifier list 6520 can receive a minimum grant of at least the minimum of the two values represented by the report request 7200 or the minimum bandwidth 7260 of the logical link identifier 2240 plus the network overhead 6210. The minimum grant ensures that each of the logical link identifier 2240 in the active logical link identifier list 6520 can receive some bandwidth in each cycle.

The main schedule grant 2140 can be calculated in a variety of methods when the congestion mode 6440 indicates "non-congestion". For example, the main schedule grant 2140 can be calculated using a pre-allocation method with a weighted maximum-minimum fairness. The main schedule grant 2140 can be calculated by pre-allocating the bandwidth grant 2220 of the maximum packet size 6320 for each of the logical link identifier 2240 in the active logical link identifier list 6520 while the available bandwidth 6200 is greater than zero.

The available bandwidth 6200 that remains can be distributed using a maximum-minimum fairness method. Each of the logical link identifier 2240 in the active logical link identifier list 6520 can be assigned the fairness factor 6410 and the active logical link identifier list 6520 sorted according to the fairness factor 6410. The DBA engine can fulfill each grant request in sorted order until the available bandwidth 6200 has been completely allocated. The grant request can be fulfilled by creating the bandwidth grant 2220 in the main schedule grant 2140 and allocating the requested bandwidth to the bandwidth grant 2220 in units of the maximum packet size 6320.

The fairness factor 6410 can be calculated in a variety of ways. For example, the fairness factor 6410 can be calculated by adding the peak information rate 6420 to the network overhead 6210 and then subtracting the bandwidth grant 2220 and then dividing the result by the weight factor 7320.

In this specific implementation described herein, the DBA engine has improved speed for calculating the main schedule grant 2140 by calculating the main schedule grant 2140 based on the congestion mode 6440. The congestion mode 6440 can determine the method of calculating the main schedule grant 2140. When the congestion mode 6440 indicates "non-congestion", then the main schedule grant 2140 can be calculated using a pre-allocation method. When the congestion mode 6440 indicates "congestion", then the main schedule grant 2140 can be calculated using a weighted maximum-minimum fairness factor to allocate bandwidth fairly to all network units. The congestion mode schedule module 7040 and the non-congestion mode schedule module 7060 can increase the speed of calculating the main schedule grant 2140 by using the appropriate method to calculate the main schedule grant 2140 based on the congestion mode 6440. This allows for an improved dynamic bandwidth allocation where the DBA engine can more efficiently calculate the main schedule grant 2140.

The DBA engine can update the main schedule grant table 5540 with the main schedule grant 2140 in the write grant schedule module 7080. The write grant schedule module 7080 can store the main schedule grant 2140 in the main schedule grant table 5540 of FIG. 12. When the write grant schedule module 7080 has completed, the control flow can pass to the bookkeeping module 6080 of FIG. 13.

Figure 15:
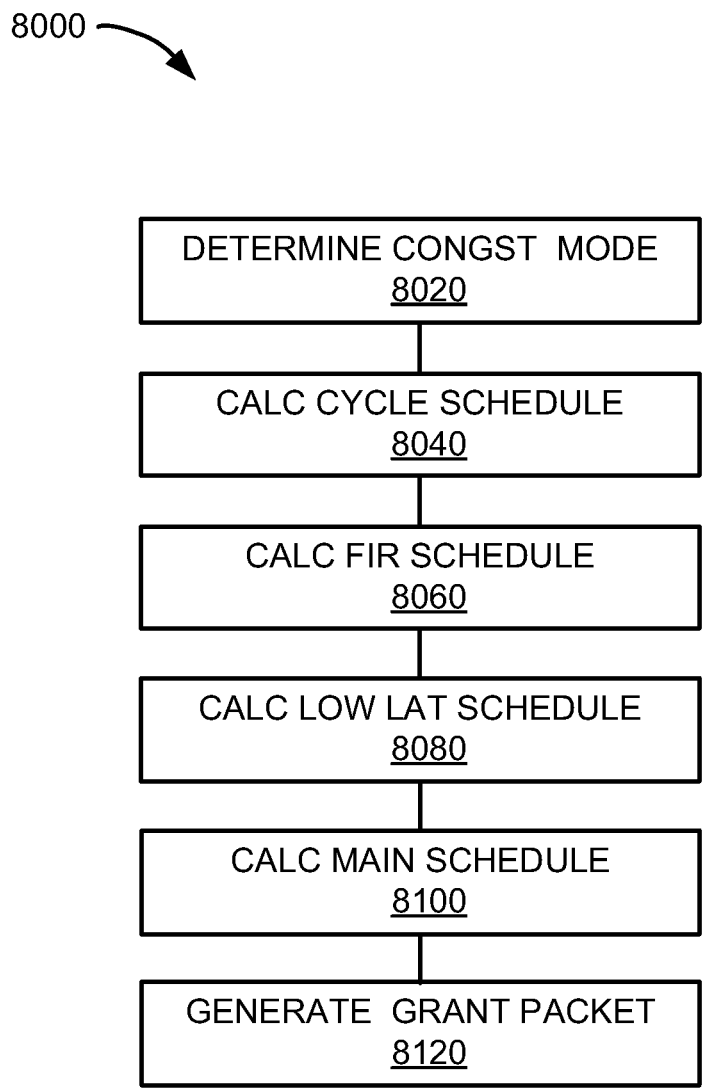
FIG. 15 is a flow chart of another embodiment of a hybrid dynamic bandwidth allocation mechanism implemented by the DBA engine.

Referring now to FIG. 15, therein is shown a flow chart of a method 8000 of operation of the DBA engine in one embodiment. The method 800 includes: determining a congestion mode in a block 8020, calculating a cycle schedule in a block 8040, calculating a fixed information rate schedule in a block 8060, calculating a low latency schedule in a block 8080, calculating a main schedule in a block 8100, and generating a grant packet in a block 8120.

Although the foregoing has been described with reference to certain specific embodiments, various modifications thereof will be apparent to those skilled in the art without departing from the scope of the claims appended hereto.

The invention claimed is:

1. A method in an Optical Line Terminal (OLT) system comprising a plurality of physical OLT Passive Optical Network (PON) ports, wherein each physical OLT PON port is for communicating with at least one Optical Network Unit (ONU), and wherein each physical OLT PON port has a respective enforced maximum upstream bandwidth; the OLT system further including an uplink port through which data received from each physical OLT PON port are transmitted; the method comprising:
preventing or alleviating congestion of said data at the uplink port of the OLT system by reducing an enforced maximum upstream bandwidth for at least one physical OLT PON port;
wherein said reducing the enforced maximum upstream bandwidth for the at least one physical OLT PON port includes the steps of:
obtaining parameters relating to each physical OLT PON port and reducing the enforced maximum upstream bandwidth for the at least one physical OLT PON by an amount dependent upon the parameters;
obtaining an indication of whether there is congestion of said data in a buffer of the OLT system, the buffer storing said data prior to transmission through the uplink port of the OLT system, and said data comprising data of different classes; and reducing the enforced maximum upstream bandwidth for the at least one physical OLT PON if there is congestion of said data in the buffer;
wherein said reducing the enforced maximum upstream bandwidth for the at least one physical OLT PON port causes the at least one physical OLT PON port to perform at least one of: (i) reducing a number of transmission windows granted to at least one ONU connected to the at least one physical OLT PON port, and (ii) reducing a duration of one or more transmission windows granted to at least one ONU connected to the at least one physical OLT PON port.

2. The method of claim 1 wherein the enforced maximum upstream bandwidth for each physical OLT PON port of the plurality of physical OLT PON ports is enforced by a respective dynamic bandwidth allocation (DBA) algorithm.

3. The method of claim 1 wherein the parameters include at least:
(i) the number of active ONUs connected to each physical OLT PON port; and
(ii) the total amount of data requested from each physical OLT PON port, the total amount of data requested from a physical OLT PON port representing a sum of the amount of data requested from ONUs connected to that physical OLT PON port; and
(iii) a total peak information rate (PIR) of each physical OLT PON port, the total PIR of a physical OLT PON port representing the sum of the PIR of each of the ONUs connected to that physical OLT PON port, wherein the PIR specifies the maximum rate at which an ONU is allowed to transmit data; and
(iv) a total committed information rate (CIR) of each physical OLT PON port, the total CIR of a physical OLT PON port representing the sum of the CIR of each of the ONUs connected to that physical OLT PON port, wherein the CIR specifies the minimum rate at which an ONU is guaranteed to transmit data; and
(v) an upstream traffic rate at each physical OLT PON port.

4. The method of claim 1 further comprising:
reducing the enforced maximum upstream bandwidth for the at least one physical OLT PON port when a total upstream traffic rate from all of the plurality of physical OLT PON ports is larger than a predetermined value.

5. The method of claim 1 wherein an amount by which an enforced maximum upstream bandwidth is reduced is dependent upon at least:
(i) upstream traffic rate information; and
(ii) at least one of a peak information rate (PIR) and a committed information rate (CIR) associated with at least one ONU; and
(iii) at least one of (a) a number of active or registered ONUs associated with the at least one physical OLT PON port, and (b) an amount of data that one or more ONUs connected to the at least one physical OLT PON port is requesting to transmit to the OLT system.

6. The method of claim 1 wherein said reducing the enforced maximum upstream bandwidth for the at least one physical OLT PON port of the plurality of physical OLT PON ports comprises reducing the maximum upstream bandwidth enforced at each physical OLT PON port of the plurality of physical OLT PON ports, and wherein an amount by which the enforced maximum upstream bandwidth is reduced for each physical OLT PON port is at least one of: (i) fixed for each physical OLT PON port; (ii) proportional to the number of active ONUs connected to the physical OLT PON port; (iii) proportional to the number of ONUs registered with the physical OLT PON port; (iv) proportional to a sum of the amount of data that each ONU connected to the physical OLT PON port is requesting to transmit to the physical OLT PON port; (v) proportional to an upstream traffic rate measured at the physical OLT PON port; (vi) proportional to a sum of the peak information rate (PIR) assigned to each ONU connected to the physical OLT PON port; and (vii) proportional to a sum of the committed information rate (CIR) assigned to each ONU connected to the physical OLT PON port.

7. The method of claim 2 wherein said reducing the enforced maximum upstream bandwidth for the at least one physical OLT PON port of the plurality of physical OLT PON ports comprises adjusting an upstream bandwidth capacity parameter of the DBA algorithm associated with the at least one physical OLT PON port of the plurality of physical OLT PON ports; the method further comprising also modifying an enforced maximum upstream bandwidth for at least one other physical OLT PON port of the plurality of physical OLT PON ports by adjusting an upstream bandwidth capacity parameter of the DBA algorithm associated with the at least one other physical OLT PON port of the plurality of physical OLT PON ports.

8. The method of claim 7 further comprising:
dividing an upstream bandwidth of the uplink port into a plurality of sub-bandwidths, each sub-bandwidth corresponding to a respective one of the plurality of physical OLT PON ports; and adjusting the upstream bandwidth capacity parameter of the DBA algorithm associated with each physical OLT PON port of the plurality of physical OLT PON ports to be equal to the corresponding sub-bandwidth.

9. The method of claim 8, wherein each sub-bandwidth corresponding to the respective one of the plurality of physical OLT PON ports is at least one of:
(i) fixed for each physical OLT PON port; (ii) proportional to the number of active ONUs connected to the corresponding physical OLT PON port; (iii) proportional to the number of ONUs registered with the corresponding physical OLT PON port; (iv) proportional to a sum of the amount of data that each ONU connected to the corresponding physical OLT PON port is requesting to transmit to the corresponding physical OLT PON port; (v) proportional to an upstream traffic rate measured at the corresponding physical OLT PON port; (vi) proportional to a sum of the peak information rate (PIR) assigned to each ONU connected to the corresponding physical OLT PON port; and (vii) proportional to a sum of the committed information rate (CIR) assigned to each ONU connected to the corresponding physical OLT PON port.

10. An Optical Line Terminal (OLT) system comprising:
a plurality of physical OLT Passive Optical Network (PON) ports, wherein each physical OLT PON port is for communicating with at least one Optical Network Unit (ONU), and wherein each physical OLT PON port having has a respective enforced maximum upstream bandwidth;
an uplink port through which data received from each physical OLT PON port are transmitted;
a buffer to store said data; and
a bandwidth modifier for alleviating or preventing congestion of said data at the uplink port of the OLT system by reducing the enforced maximum upstream bandwidth for at least one physical OLT PON port of the plurality of physical OLT PON ports;
wherein said reducing the enforced maximum upstream bandwidth for the at least one physical OLT PON port includes:
obtaining parameters relating to each physical OLT PON port and reducing the enforced maximum upstream bandwidth for the at least one physical OLT PON by an amount dependent upon the parameters;
obtaining an indication of whether there is congestion of said data in the buffer of the OLT system, the buffer storing said data prior to transmission through the uplink port of the OLT system, and said data comprising data of different classes; and reducing the enforced maximum upstream bandwidth for the at least one physical OLT PON if there is congestion of said data in the buffer;
wherein said reducing the enforced maximum upstream bandwidth for the at least one physical OLT PON port of the plurality of physical OLT PON ports causes the at least one physical OLT PON port in the OLT system to perform at least one of: (i) reducing a number of transmission windows granted to at least one ONU connected to the at least one physical OLT PON port, and (ii) reducing a duration of one or more transmission windows granted to at least one ONU connected to the at least one physical OLT PON port.

11. The OLT system of claim 10 further comprising a dynamic bandwidth allocation (DBA) engine associated with one of the plurality of physical OLT PON ports.

12. The OLT system of claim 11 wherein the bandwidth modifier is a component of the DBA engine.

13. The OLT system of claim 10 further comprising a respective DBA engine associated with each of the plurality of physical OLT PON ports, and wherein the enforced maximum upstream bandwidth for each physical OLT PON port of the plurality of physical OLT PON ports is enforced by the respective DBA engine.

14. The OLT system of claim 10 wherein the parameters include at least:
(i) the number of active ONUs connected to each physical OLT PON port; and
(ii) the total amount of data requested from each physical OLT PON port, the total amount of data requested from a physical OLT PON port representing a sum of the amount of data requested from ONUs connected to that physical OLT PON port; and
(iii) a total peak information rate (PIR) of each physical OLT PON port, the total PIR of a physical OLT PON port representing the sum of the PIR of each of the ONUs connected to that physical OLT PON port, wherein the PIR specifies the maximum rate at which an ONU is allowed to transmit data; and
(iv) a total committed information rate (CIR) of each physical OLT PON port, the total CIR of a physical OLT PON port representing the sum of the CIR of each of the ONUs connected to that physical OLT PON port, wherein the CIR specifies the minimum rate at which an ONU is guaranteed to transmit data; and
(v) an upstream traffic rate at each physical OLT PON port.

15. The OLT system of claim 10 further comprising a congestion detector, and wherein the congestion detector detects there is congestion when a total upstream traffic rate from all of the plurality of physical OLT PON ports is larger than a predetermined value.

16. The OLT system of claim 10 wherein an amount by which an enforced maximum upstream bandwidth is reduced is dependent upon at least:
(i) upstream traffic rate information; and
(ii) at least one of a peak information rate (PIR) and a committed information rate (CIR) associated with at least one ONU; and
(iii) at least one of (a) a number of active or registered ONUs associated with the at least one physical OLT PON port, and (b) an amount of data that one or more ONUs connected to the at least one physical OLT PON port is requesting to transmit to the OLT system.

17. The OLT system of claim 10 wherein said reducing the enforced maximum upstream bandwidth for the at least one physical OLT PON port of the plurality of physical OLT PON ports comprises reducing the maximum upstream bandwidth enforced at each physical OLT PON port of the plurality of physical OLT PON ports, and wherein an amount by which the enforced maximum upstream bandwidth is reduced for each physical OLT PON port is at least one of: (i) fixed for each physical OLT PON port; (ii) proportional to the number of active ONUs connected to the physical OLT PON port; (iii) proportional to the number of ONUs registered with the physical OLT PON port; (iv) proportional to a sum of the amount of data that each ONU connected to the physical OLT PON port is requesting to transmit to the physical OLT PON port; (v) proportional to an upstream traffic rate measured at the physical OLT PON port; (vi) proportional to a sum of the peak information rate (PIR) assigned to each ONU connected to the physical OLT PON port; and (vii) proportional to a sum of the committed information rate (CIR) assigned to each ONU connected to the physical OLT PON port.

18. The OLT system of claim 13 wherein said reducing the enforced maximum upstream bandwidth for the at least one physical OLT PON port of the plurality of physical OLT PON ports comprises adjusting an upstream bandwidth capacity parameter of a DBA algorithm implemented by the DBA engine associated with the at least one physical OLT PON port of the plurality of physical OLT PON ports; and wherein an enforced maximum upstream bandwidth for at least one other physical OLT PON port of the plurality of physical OLT PON ports is also modified by adjusting an upstream bandwidth capacity parameter of the DBA algorithm associated with the at least one other physical OLT PON port of the plurality of physical OLT PON ports.

19. The OLT system of claim 18 wherein reducing or modifying the enforced maximum upstream bandwidth comprises:
dividing an upstream bandwidth of the uplink port into a plurality of sub-bandwidths, each sub-bandwidth corresponding to a respective one of the plurality of physical OLT PON ports; and adjusting the upstream bandwidth capacity parameter of the DBA algorithm associated with each physical OLT PON port of the plurality of physical OLT PON ports to be equal to the corresponding sub-bandwidth.

20. The OLT system of claim 19, wherein each sub-bandwidth corresponding to the respective one of the plurality of physical OLT PON ports is at least one of:
(i) fixed for each physical OLT PON port; (ii) proportional to the number of active ONUs connected to the corresponding physical OLT PON port; (iii) proportional to the number of ONUs registered with the corresponding physical OLT PON port; (iv) proportional to a sum of the amount of data that each ONU connected to the corresponding physical OLT PON port is requesting to transmit to the corresponding physical OLT PON port; (v) proportional to an upstream traffic rate measured at the corresponding physical OLT PON port; (vi) proportional to a sum of the peak information rate (PIR) assigned to each ONU connected to the corresponding physical OLT PON port; and (vii) proportional to a sum of the committed information rate (CIR) assigned to each ONU connected to the corresponding physical OLT PON port.

21. A non-transitory computer readable medium having stored thereon computer readable instructions for execution in one or more processing devices in an Optical Line Terminal (OLT) system, the OLT system having: (i) a plurality of physical OLT Passive Optical Network (PON) ports, wherein each physical OLT PON port of the plurality of physical OLT PON ports is for communicating with at least one Optical Network Unit (ONU) and each physical OLT PON port of the plurality of physical OLT PON ports having a respective enforced maximum upstream bandwidth, and (ii) an uplink port through which data received from each of the plurality of physical OLT PON ports are transmitted; when executed, the computer readable instructions cause the one or more processing devices to perform a method comprising:
preventing or alleviating congestion of said data at the uplink port of the OLT system by reducing an enforced maximum upstream bandwidth for at least one physical OLT PON port of the plurality of physical OLT PON ports;
wherein said reducing the enforced maximum upstream bandwidth for the at least one physical OLT PON port includes:
obtaining parameters relating to each physical OLT PON port and reducing the enforced maximum upstream bandwidth for the at least one physical OLT PON by an amount dependent upon the parameters;
obtaining an indication of whether there is congestion of said data in a buffer of the OLT system, the buffer storing said data prior to transmission through the uplink port of the OLT system, and said data comprising data of different classes; and reducing the enforced maximum upstream bandwidth for the at least one physical OLT PON if there is congestion of said data in the buffer;
wherein said reducing the enforced maximum upstream bandwidth for the at least one physical OLT PON port of the plurality of physical OLT PON ports causes the at least one physical OLT PON port in the OLT system to perform at least one of: (a) reducing a number of transmission windows granted to at least one ONU connected to the at least one physical OLT PON port, and (b) reducing a duration of one or more transmission windows granted to at least one ONU connected to the at least one physical OLT PON port.

22. The computer readable medium of claim 21 wherein an amount by which an enforced maximum upstream bandwidth is reduced is dependent upon at least:
(i) upstream traffic rate information; and
(ii) at least one of a peak information rate (PIR) and a committed information rate (CIR) associated with at least one ONU; and
(iii) at least one of (a) a number of active or registered ONUs associated with the at least one physical OLT PON port, and (b) an amount of data that one or more ONUs connected to the at least one physical OLT PON port is requesting to transmit to the OLT system.

23. The computer readable medium of claim 21 wherein the parameters include at least:
(i) the number of active ONUs connected to each physical OLT PON port; and
(ii) the total amount of data requested from each physical OLT PON port, the total amount of data requested from a physical OLT PON port representing a sum of the amount of data requested from ONUs connected to that physical OLT PON port; and
(iii) a total peak information rate (PIR) of each physical OLT PON port, the total PIR of a physical OLT PON port representing the sum of the PIR of each of the ONUs connected to that physical OLT PON port, wherein the PIR specifies the maximum rate at which an ONU is allowed to transmit data; and
(iv) a total committed information rate (CIR) of each physical OLT PON port, the total CIR of a physical OLT PON port representing the sum of the CIR of each of the ONUs connected to that physical OLT PON port, wherein the CIR specifies the minimum rate at which an ONU is guaranteed to transmit data; and
(v) an upstream traffic rate at each physical OLT PON port.

24. The computer readable medium of claim 21 wherein the enforced maximum upstream bandwidth for each physical OLT PON port of the plurality of physical OLT PON ports is enforced by a respective dynamic bandwidth allocation (DBA) algorithm; wherein said reducing the enforced maximum upstream bandwidth for the at least one physical OLT PON port of the plurality of physical OLT PON ports comprises adjusting an upstream bandwidth capacity parameter of the DBA algorithm associated with the at least one physical OLT PON port of the plurality of physical OLT PON ports; and wherein an enforced maximum upstream bandwidth for at least one other physical OLT PON port of the plurality of physical OLT PON ports is also modified by adjusting an upstream bandwidth capacity parameter of the DBA algorithm associated with the at least one other physical OLT PON port of the plurality of physical OLT PON ports.

25. An Optical Line Terminal (OLT) system comprising:
a plurality of physical OLT Passive Optical Network (PON) ports, each physical OLT PON port of the plurality of physical OLT PON ports for communicating with at least one Optical Network Unit (ONU), and each physical OLT PON port of the plurality of physical OLT PON ports having a respective enforced maximum upstream bandwidth;
an uplink port through which data received from each of the plurality of physical OLT PON ports are transmitted; and
means for reducing the enforced maximum upstream bandwidth for at least one physical OLT PON port of the plurality of physical OLT PON ports to alleviate or prevent congestion of said data at the uplink port;
wherein said reducing the enforced maximum upstream bandwidth for the at least one physical OLT PON port includes:
obtaining parameters relating to each physical OLT PON port and reducing the enforced maximum upstream bandwidth for the at least one physical OLT PON by an amount dependent upon the parameters;
obtaining an indication of whether there is congestion of said data in a buffer of the OLT system, the buffer storing said data prior to transmission through the uplink port of the OLT system, and said data comprising data of different classes; and reducing the enforced maximum upstream bandwidth for the at least one physical OLT PON if there is congestion of said data in the buffer;
wherein said reducing the enforced maximum upstream bandwidth for the at least one physical OLT PON port of the plurality of physical OLT PON ports causes the at least one physical OLT PON port in the OLT system to perform at least one of: (i) reducing a number of transmission windows granted to at least one ONU connected to the at least one physical OLT PON port, and (ii) reducing a duration of one or more transmission windows granted to at least one ONU connected to the at least one physical OLT PON port.

26. A method in an Optical Line Terminal (OLT) system having a plurality of physical OLT Passive Optical Network (PON) ports, each physical OLT PON port of the plurality of physical OLT PON ports for communicating with at least one Optical Network Unit (ONU), the OLT system further including an uplink port through which data received from each of the plurality of physical OLT PON ports are transmitted; the method comprising:
preventing or alleviating congestion of said data at the uplink port of the OLT system by performing at least one of: (i) reducing a number of transmission windows granted to at least one ONU connected to at least one physical OLT PON port of the plurality of physical OLT PON ports, and (ii) reducing a duration of one or more transmission windows granted to at least one ONU connected to the at least one physical OLT PON port of the plurality of physical OLT PON ports;
wherein said reducing the number of transmission windows and/or said reducing the duration of one or more transmission windows includes the steps of:
obtaining parameters relating to each physical OLT PON port and reducing the number of transmission windows and/or reducing the duration of one or more transmission windows by an amount dependent upon the parameters;
obtaining an indication of whether there is congestion of said data in a buffer of the OLT system, the buffer storing said data prior to transmission through the uplink port of the OLT system, and said data comprising data of different classes; and reducing the number of transmission windows and/or reducing the duration of one or more transmission windows if there is congestion of said data in the buffer;
wherein the parameters include at least:
(i) the number of active ONUs connected to each physical OLT PON port; and
(ii) the total amount of data requested from each physical OLT PON port, the total amount of data requested from a physical OLT PON port representing a sum of the amount of data requested from ONUs connected to that physical OLT PON port; and
(iii) a total peak information rate (PIR) of each physical OLT PON port, the total PIR of a physical OLT PON port representing the sum of the PIR of each of the ONUs connected to that physical OLT PON port, wherein the PIR specifies the maximum rate at which an ONU is allowed to transmit data; and
(iv) a total committed information rate (CIR) of each physical OLT PON port, the total CIR of a physical OLT PON port representing the sum of the CIR of each of the ONUs connected to that physical OLT PON port, wherein the CIR specifies the minimum rate at which an ONU is guaranteed to transmit data; and
(v) an upstream traffic rate at each physical OLT PON port.

27. The method of claim 26 further comprising:
obtaining the indication that there is congestion of said data in the buffer when an amount of said data stored in the buffer is greater than a predetermined value.

28. The method of claim 26 wherein an amount by which the number of transmission windows granted is reduced, or the amount by which the duration of the one or more transmission windows is reduced, is also at least one of: (i) fixed for each physical OLT PON port; (ii) proportional to the number of active ONUs connected to the physical OLT PON port; (iii) proportional to the number of ONUs registered with the physical OLT PON port; (iv) proportional to a sum of the amount of data that each ONU connected to the physical OLT PON port is requesting to transmit to the physical OLT PON port; (v) proportional to an upstream traffic rate measured at the physical OLT PON port; (vi) proportional to a sum of the peak information rate (PIR) assigned to each ONU connected to the physical OLT PON port; and (vii) proportional to a sum of the committed information rate (CIR) assigned to each ONU connected to the physical OLT PON port.

* * * * *